United States Patent
Rogers et al.

(10) Patent No.: US 6,725,130 B1
(45) Date of Patent: Apr. 20, 2004

(54) METHOD, APPARATUS AND CONTROL LOGIC FOR DAMAGE RECONFIGURATION OF AN ELECTRO-MECHANICAL SYSTEM

(75) Inventors: John L. Rogers, Mount Laurel, NJ (US); Mark M. Zerby, Ridley Park, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 369 days.

(21) Appl. No.: 09/849,491

(22) Filed: May 4, 2001

Related U.S. Application Data

(60) Provisional application No. 60/201,754, filed on May 4, 2000.

(51) Int. Cl.$^7$ .................................................. G05D 7/06
(52) U.S. Cl. .................... 700/282; 700/46; 700/275; 137/15.11; 361/63; 702/51; 702/58
(58) Field of Search ............................. 700/26, 46, 275, 700/282; 73/199; 137/15.11, 109, 115.04, 555; 251/129.02; 361/64, 63; 702/51–53, 58, 100

(56) References Cited

U.S. PATENT DOCUMENTS

| | | |
|---|---|---|
| 3,970,898 A | 7/1976 | Baumann et al. |
| 4,038,497 A | 7/1977 | Collins et al. |
| 5,341,268 A | 8/1994 | Ishiguro et al. |
| 5,384,714 A * | 1/1995 | Kidd .......................... 700/282 |
| 5,760,492 A | 6/1998 | Kanoi et al. |
| 5,930,492 A | 7/1999 | Lynch |
| 6,018,449 A | 1/2000 | Nelson et al. |

* cited by examiner

*Primary Examiner*—Leo Picard
*Assistant Examiner*—Carlos R. Ortiz
(74) *Attorney, Agent, or Firm*—Howard Kaiser

(57) ABSTRACT

In an electro-mechanical distribution system having plural units each comprising a valve/switch and dual sensors, a computer is associated with each unit so as to process sensor information and control the valve/switch. According to the control logic, a unit is either in normal mode or fault mode. The fault mode begins with a transient waiting period and may continue on to a series of steps. A step waiting period (wherein the valve is closed) may be followed by the step testing period (wherein the valve is closed) of the same step; a step testing period may be followed by the step waiting period of the next step. Fault mode is triggered if at any time during normal mode either sensor detects a fault condition. Normal mode is triggered if at any time during fault mode both sensors concurrently detect a normal condition.

27 Claims, 15 Drawing Sheets

Algorithm Overview

Flowchart for Reset Process

Flowchart for "Fault Isolation Test - Step 1" Mode

Flowchart for "Fault Isolation Test - Step 2" Mode

METHOD, APPARATUS AND CONTROL LOGIC FOR DAMAGE RECONFIGURATION OF AN ELECTRO-MECHANICAL SYSTEM

CROSS-REFERENCE TO RELATED APPLICATION

This application claims the benefit of U.S. Provisional Patent Application No. 60/201,754 filed May 4, 2000, entitled "Control Logic for Damage Reconfiguration of an Electro-Mechanical System Using Distributed Control without Network Communications and Using Identical Software on Each Node," incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to fluid-mechanical and other electro-mechanical systems, more particularly to methods and apparatuses for ascertaining or assessing defects in such systems.

A pressurized fluid delivery system is a type of electro-mechanical delivery system. Pressurized fluid delivery systems normally include a pump (for water or other liquid) or compressor (for air or other gas), a conduit configured in plural sections, plural pressure switches and plural valves. Typically, when the system "springs a leak," several pressure switches react to the drop in pressure, with the result that the entire system automatically shuts down. This total system shutdown is frequently an unnecessary and unwanted consequence of a single leak.

More generally, it is frequently undesirable for an electro-mechanical delivery system of any kind to unnecessarily shut down as a consequence of a single fault or defect, especially if such system can continue to operate in near-optimal fashion in spite of such fault or defect.

SUMMARY OF THE INVENTION

In view of the foregoing, it is an object of the present invention to provide method, apparatus and software for pinpointing a fault or defect in an electro-mechanical delivery system such as a pressurized fluid delivery system.

It is a further object of the present invention to provide such method, apparatus and software so that such system can avoid shutdown.

It is another object of the present invention to provide such method, apparatus and software so that such system can continue to operate, substantially as it had before the occurrence of the fault or defect, in circumventive fashion with respect to the fault or defect.

In accordance with many embodiments of the present invention, a processor-controller is associated with at least one combination (more typically, each combination) of a valve/switch and dual sensors, such combination being included in an electro-mechanical distribution system. The processor-controller processes information received from the sensors and controls the open-versus-closed actuation of the valve/switch. According to the inventive control logic, the valve/switch-sensor combination is either in normal mode or fault (defect) mode. When a fault condition of either sensor is detected, the processor-controller converts from normal mode to fault mode. A "transient waiting" period takes place at the outset of the fault mode. Then, the control logic may either continue in fault mode by proceeding through a sequence of steps, or return to normal mode. In each step, a "step waiting period" (during which time the valve is closed) may be followed by a "step testing period" (during which time the valve is closed). While in normal mode, if at any time either sensor detects a fault condition, the control logic goes to fault mode; otherwise, the control logic remains in normal mode. While in fault mode, if at any time both sensors concurrently detect a normal condition, the control logic returns to normal mode; otherwise, the control logic remains in fault mode. When the inventive stepped control logic sequence is complete, the inventive practitioner realizes that the suspected fault associated with a given such combination is most likely real.

Many embodiments of the present invention provide apparatus for use in association with an electro-mechanical distribution system characterized by at least one branch, an entity (e.g., fluid or electrical current) for being distributed by said electro-mechanical distribution system to some degree by way of said at least one branch, at least one source of said entity, and at least one station for affecting distribution of said entity. The at least one station is in communication with the at least one branch. Each station includes switching means and a pair of sensing means on both sides of the switching means. The inventive apparatus is for isolating at least one fault condition within the electro-mechanical distribution system. The inventive apparatus comprises at least one machine having a memory. Each machine: is connected with a station; receives input from the corresponding pair of sensing means; effectuates control with respect to the corresponding switching means; contains a data representation of a stepped control logic scheme which defines the effectuating of control and which relates to the corresponding pair of sensing means and the corresponding switching means. The stepped control logic scheme includes a normal mode and a fault mode, wherein the indication of a fault condition by at least one of the corresponding pair of said sensing means at any time during said normal mode results in a change from said normal mode to said fault mode, and wherein the simultaneity of indication of a normal condition by both of the corresponding pair of said sensing means at any time during said fault mode results in a change from said fault mode to said normal mode.

Typically according to such inventive apparatus embodiments, the fault mode includes at least one step. Each step includes a pre-test waiting period and a testing period which follows the pre-test waiting period. During the pre-test waiting period the switching means is in a closed condition. During the testing period the switching means is in an open condition. If it does not occur at any time during the pre-test waiting period that both of the corresponding pair of sensing means simultaneously indicate a normal condition, the switching means is rendered in an open condition at the conclusion of the pre-test waiting period, whereupon the testing period commences. If it does not occur at any time during the testing period that both of the corresponding pair of sensing means simultaneously indicate a normal condition, the switching means is rendered in a closed condition at the conclusion of the testing period. If it occurs at any time during the pre-test waiting period that both of the corresponding pair of sensing means simultaneously indicate a normal condition, the switching means is rendered in an open condition at the conclusion of the pre-test waiting period, whereupon the normal mode resumes.

If it occurs at any time during the testing period that both of the corresponding pair of sensing means simultaneously indicate a normal condition, the switching means remains in an open condition at the conclusion of the testing period, whereupon the normal mode resumes.

Also typical according to such inventive apparatus embodiments, the fault mode includes a transient test waiting period which precedes the first step. If both of the corresponding pair of sensing means simultaneously indicate a fault condition, the transient test waiting period commences. During the transient test waiting period the switching means remains in an open condition. If it does not occur at any time during the transient test waiting period that both of the corresponding pair of said sensing means simultaneously indicate a normal condition, the switching means is rendered in a closed condition at the conclusion of the transient test waiting period, whereupon the first pre-test waiting period commences.

Further typical according to such inventive apparatus embodiments, there are at least two sequential steps. Each sequential step except the last sequential step is followed by a pre-test waiting period of the succeeding sequential step. Beginning the second sequential step, each pre-test waiting period is longer than the preceding pre-test waiting period. Beginning the second sequential step, each testing period is shorter than the preceding testing period. According to many such inventive apparatus embodiments, the duration of the transient test waiting period, the durations of the pre-test waiting periods, and the durations of the testing periods, are based on the following inventive principles: The amount of time required for the switching means to be rendered in an open condition and for the system to stabilize is designated "o". The amount of time required for the switching means to be rendered in a closed condition and for the system to stabilize is designated "c". An incremental period to be added onto each of o and c is designated "m". The expression $2(c+m)$ is designated "p", wherein p is equal to the value $2(c+m)$. The total number of sequential steps is designated "$n_T$". Each sequential step is designated the "n"th sequential step, wherein "n" corresponds to the sequential number of the sequential step. The pre-test waiting period of the "n"th sequential step will be equal to a value of no less than np and no greater than $(n+1)p$. The transient test waiting period will be equal to the value $[(n_T+1)c+m]$. The testing period of the "n"th said sequential step will be equal to the value $[(n_T-n+1)c+m]$.

The present invention additionally provides a computer program product comprising a computer useable medium having computer program logic recorded thereon for enabling computer means to ascertain a state of defectiveness relating to a station in an electro-mechanical system for moving an entity (e.g., fluid or electrical current). The station affects the movement of the entity. The station includes the combination of switching means and two sensing means. The two sensing means are on opposite sides of the switching means. According to typical inventive computer program product embodiments, the computer program logic comprises: means for enabling the computer means to establish a normal mode and a fault mode; means for enabling the computer means to appreciate the indication of a normal condition by either of the two sensing means; means for enabling the computer means to appreciate the indication of a fault condition by either of the two sensing means; following the indication of a fault condition by at least one of the two sensing means at any time during the normal mode, means for enabling the computer means to effect a change from the normal mode to the fault mode; following the simultaneous indication of a normal condition by both the sensing means at any time during the fault mode, means for enabling the computer means to effect a change from the fault mode to the normal mode; means for enabling the computer means to establish at least one step in the fault mode; means for enabling the computer means to establish, in each step, a pre-test waiting period and a testing period which follows the pre-test waiting period; means for enabling the computer means to cause the switching means to be in a closed condition during the pre-test waiting period; and, means for enabling the computer means to cause the switching means to be in an open condition during the testing period. Typically, the computer program logic further comprises means for enabling the computer to confirm ascertainment of the state of defectiveness of the station. When there is an absence of simultaneous indication of a normal condition by both sensing means at any time during the testing period, at the conclusion of the testing period, if there is not a next step, the computer means confirms ascertainment of the state of defectiveness of said station.

Typically according to such inventive computer program product embodiments, when there is an absence of simultaneous indication of a normal condition by both sensing means at any time during the pre-test waiting period, the following occur: at the conclusion of the pre-test waiting period, the computer means causes the switching means to adjust to an open condition; the computer means dictates that the fault mode continue to exist; and, (iii) at the conclusion of the pre-test waiting period, the computer means dictates that the testing period of the same step commence. When there is an absence of simultaneous indication of a normal condition by both the sensing means at any time during said testing period, the following occur: (i) at the conclusion of the testing period, the computer means causes the switching means to adjust to a closed condition; (ii) the computer means dictates that the fault mode continue to exist; and (iii) at the conclusion of the testing period, if there is a next step, the computer means dictates that the pre-test waiting period of the next step commence. When there is simultaneous indication of a normal condition by both sensing means at any time during the pre-test waiting period, the following occur: (i) the computer means causes the switching means to be in an open condition at the conclusion of the pre-test waiting period; and, (ii) the computer means dictates that the normal mode exist, the computer means thereby dictating that the fault mode cease to exist. When there is simultaneous indication of a normal condition by both said sensing means at any time during said pre-test waiting period, the following occur: (i) the computer means causes the switching means to be in an open condition at the conclusion of the pre-test waiting period; and, (ii) the computer means dictates that the normal mode exist, the computer means thereby dictating that the fault mode cease to exist.

Further provided by the present invention is a method for recognizing at least one defective condition within an electro-mechanical system. The electro-mechanical system is of a kind which motivates an entity (e.g., fluid or electrical current) through at least one pathway of the system. The system has at least one station. Each station includes valvular means and two sensing means wherein the valvular means is generally interposed between the two sensing means. According to many such inventive method embodiments, with regard to a particular station the method comprises receiving information from each sensing means and regulating the switching means, wherein based on the received information the regulating is described by the following: The system is considered to be in either normal mode or defective mode. The defective mode includes an initial waiting period and a succession of plural steps. The initial waiting period precedes the succession of plural steps. Each step has a step waiting period and a step testing period. Within each step the step waiting period precedes the step testing period. As the succession of plural steps advances, the duration of each step waiting period increases. As the succession of plural steps advances, the duration of each step testing period decreases. During the normal mode, the valvular means is in an open position. During the initial waiting period, the valvular means is in a closed position. During each step waiting period, the valvular means is in a closed position. During each step testing period, the valvular means is in an open position. The normal mode ends and the defective mode begins as a consequence of the occurrence, at any time during the normal mode, of a defective condition pertaining to at least one sensing means. The defective mode ends and the normal mode begins as a consequence of the simultaneous occurrence, at any time during the defective mode, of a normal condition pertaining to both sensing means. The normal mode continues in the absence of the occurrence, at any time during the normal mode, of a defective condition pertaining to at least one sensing means. The defective mode continues in the absence of the simultaneous occurrence, at any time during said defective mode, of a normal condition pertaining to both sensing means. The defective condition is deemed fully recognized upon the completion of the final testing period of the defective mode.

The present invention is rooted in its appreciation that, if a leak in a pressurized fluid delivery system could be identified, isolated and circumvented, the pressurized fluid delivery system would thereby continue to operate with near-optimum efficiency. The present invention recognizes and fills a need in association with practically any electro-mechanical delivery system which is susceptible to occurrence of a fault or defect. This need is for a methodology which enables the electro-mechanical delivery system to continue operating substantially as intended in the absence of such fault or defect. The inventive methodology essentially involves or leads to identification, isolation and circumvention of such fault or defect.

The present invention provides a software-based methodology for automated damage reconfiguration of an electro-mechanical delivery system such as a pressurized fluid (liquid or gas) delivery system—for example, a pressurized air delivery system. Featured by the present invention, inter alia, is a distributed control strategy which is effectuated in the absence of communications between valve controllers. Typical embodiments of the present invention effectuate distributed control: (i) in the absence of network communications; (ii) in the absence of location information; and, (iii) using identical software on each "station."

Generally, the inventive algorithm provides automated damage reconfiguration in the event of a fault in an electro-mechanical distribution system. The core idea used by the inventive algorithm is its stepped control logic. The present invention typically provides inventive control logic for damage reconfiguration of an electro-mechanical distribution system utilizing distributed control without network communications or location information and using identical software on each station (control unit). Notably, typical inventive embodiments provide automated damage reconfiguration without network communication in the event of a fault in an electro-mechanical distribution system.

The term "electro-mechanical distribution system" refers to any distribution system which has indicia of both mechanical operation and electrical operation, wherein such system includes apparatus of an electrical and/or mechanical nature, and wherein such system has a purpose of moving an entity (such as fluid or electricity) in or through the system, typically for distributive purposes.

The term "station" as used herein refers to any electrical, mechanical or electro-mechanical apparatus or combination of apparatuse located in the "circuitry" of an electro-mechanical distribution system, wherein such apparatus has a terminal or gate-like function relating to control of the distribution of an entity (e.g., fluid or electricity) in or through the electro-mechanical distribution system, and wherein such device effectively or potentially represents a discontinuity or change in the movement (e.g., flow or transmission) of such entity in or through the electro-mechanical distribution system.

Typically, a noninventive "station" includes: (i) circuit-breaking means, for "breaking" a circuit (e.g., valvular means for breaking a fluid piping circuit, or electrical switch means for breaking an electrical circuit); and (ii) threshold-operating means, for determining the respective conditions (e.g., as pertains to a fault or defect) existing, in the circuity, adjacent to the circuit-breaking means on each of both sides of the circuit-breaking means.

For instance, a "station" in a fluid distribution system can include a valve and a pair of pressure switches on either side of the valve, such as described herein in relation to a pressurized air delivery system used for inventive testing. A pressure switch is a device which converts presure change into an electrical function, and typically includes a diaphragm. A diaphragm is a membrane, made of flexible material, which is deflected by input pressure and thus represents the sensing element of a pressure switch. A sensing element is the portion of a pressure switch which is directly responsive to changes in input pressure. A "station" in an electric distribution system can include, for instance, an electrical switch and an electrical measuring or sensing device (e.g., a voltmeter or ampmeter) on either side of the electrical switch.

According to typical embodiments of this invention, at least one "noninventive station" is inventively amplified so as to include not only a valve/switch and sensors, but to also include controller/processor means. In other words, the noninventive station is inventively amplified so as to include a grouping of a valve/switch, sensors, a controller and a computer chip. Such grouping effectively represents a unit which can be referred to as a control unit. In other words, according to typical inventive embodiments, a conventional (noninventive) station (which comprises a valve/switch and sensors) is rendered further inclusive so as to become an "inventive station." The inventive station (or, synonymously as used herein, "inventive control unit") includes a valve/switch, sensors, a controller and a computer chip. According to frequent inventive practice, then, the conventional station is placed in a functional relationship (and perhaps a structural relationship, as well) with controller/processor means (which typically, according to the present invention, includes a controller and a computer chip).

Although the inventive algorithm was tested on a compressed air distribution (pressurized air delivery) system with multiple branches, the inventive algorithm may be applied to other types of systems by altering the values used by the stepped control logic. In relation to a pressurized air delivery system, the inventive algorithm has been thoroughly tested and demonstrated using multiple branches with multiple faults and multiple service loads. The multiple faults were introduced simultaneously and in sequence during system reconfiguration. The faults were also introduced with service loads pre-existing and with additional service loads being added during system reconfiguration with additional faults being added during system reconfiguration. The sizes of both the individual faults and service loads were varied to simulate actual faults and loads.

The inventive algorithm provides damage reconfiguration, typically using low-cost components and computer chips having relatively small memories (processor speed must be appropriate for the system being reconfigured). Furthermore, the present invention avoids the use of networks, and installation and maintenance are simple. In the compressed air delivery system on which the inventive algorithm was tested, simple pressure switches (as opposed to pressure sensors) were used along with valve controllers that only implement two states, viz., open or closed (as opposed to continuously variable valve position controllers).

Inventive practice admits of greater refinement involving more advanced components. For instance, an inventive embodiment of a damage reconfiguration system using more advanced sensors and control valves would provide a greater level of sophistication; however, this kind of more refined inventive approach may not be preferable for many applications, since the cost of a more sophisticated system will often prove to be significantly greater than the cost of a less sophisticated system, especially if the system being automated is large. The present invention generally works quite well using less advanced sensors, the inventive algorithm handles calibration variances that tend to become greater in lower priced sensors.

According to typical inventive embodiments, to provide ease of installation and repair as well as system expansion or system layout changes, the inventive algorithm is identical on all nodes, and location information is not required. In contrast, according to some other, noninventive types of reconfiguration systems, individual stations must be programmed during installation with location data that indicates the specific location of the station in the overall system. In these other types of systems, the station will not perform its function properly without the location information. Therefore, installation and replacement of stations in these other types of systems involves programming in the location-specific data during installation and/or replacement of a station; expanding such a system to include additional stations or altering the layout of the system may involve a redesign of the algorithm pertaining to such system. By comparison, no location information is needed according to the present invention; because the inventive algorithm uses no location information, installation or replacement of stations or expansion or layout changes is simpler and less costly.

Network communications are not needed for proper functioning of the inventive algorithm. Therefore, the costs associated with network installation and maintenance can be avoided and network failures will not affect system performance. Nevertheless, the inventive algorithm tested on the compressed air system and described herein utilizes network communications for the sole purpose of demonstrating remote observation and manual override control capabilities; that is, this was only aimed to facilitate observation of system operation during presentations of the working system and to demonstrate the utility of manual override control. A network bus and a personal computer running human-machine interface (HMI) software were used. In inventive practice, the personal computer and the network are not necessary for correct functioning of the present invention's autonomous damage reconfiguration algorithm; they can, however, be included in inventive embodiments in situations wherein system observation and/or manual override control are desired.

In accordance with the present invention, in the event of malfunction of one or more stations, the remainder of the inventive system will continue to function correctly. Each station performs its function as a stand-alone device. Because the stations do not communicate with one another, their proper functioning will not be affected by the behavior of other stations.

The inventive automated damage reconfiguration system described herein is uncomplicated, effective and relatively inexpensive to install and maintain. No network is required, thus avoiding costs associated with network installation and maintenance. No location information is needed, thus reducing costs associated with installation, replacement and system expansion. According to many inventive embodiments the inventive algorithm is simple and small, therefore allowing use of relatively small (in terms of memory), lower priced computer chips at each station. The inventive algorithm typically uses only two simple, low cost sensors at each station. The sensors need not adhere to strict calibration requirements. Generally, for a compressible fluid distribution system (liquid or gas distribution system), the required sensors are low cost pressure switches.

An inventive software prototype was installed and thoroughly tested on a full scale U.S. Naval Destroyer model of a low-pressure air delivery system. Singular and multiple leaks were successfully isolated, and multiple leaks were introduced simultaneously and sequentially. The inventive software distinguished between leaks that dropped the pressure below a set threshold and loads that did not. Further, no oscillations occurred when slow leaks were introduced.

A preferred embodiment of the inventive software, such as that used for U.S. Navy testing, includes a stepped control scheme that uses timing which depends on system parameters such as the speed of the valve actuators, the system volume, the number of sources and the supply pressure. The inventive testing proved successful; during the testing, only the valves directly adjacent to the leak remained closed and no other valves remained closed erroneously. Each and every valve controller contained the identical inventive software. Location information was not used, since no network communication was used between the Neuron Chips in this system.

The methodology according to this invention allows for successful automatic reconfiguration of the electro-mechanical system in the event of a network failure. The invention accomplishes automated damage reconfiguration of an electro-mechanical system (e.g., a pressurized air delivery system) via a distributed control scheme and without communications between/among the controllers (e.g., valve controllers). According to many inventive embodiments, the program also responds to "manual override open", "manual override closed" and "reset and return to automatic mode" commands from human-machine interface (HMI) software running on a separate processor.

The automated damage reconfiguration algorithm in accordance with the present invention is both simple and effective. At the heart of this invention is its stepped control logic. A network is not needed for autonomous damage reconfiguration, and no location information is required. The inventive algorithm is typically designed for use with low-cost sensors, two state gate controllers and computer chips with relatively small memory. The inventive algorithm is designed to handle multiple branches, multiple service loads and multiple faults. The inventive algorithm has been thoroughly tested on a compressed air distribution and may be applied to any electro-mechanical distribution system.

Installation and maintenance associated with the present invention are relatively simple. The inventive algorithm handles sensor calibration variances, and its operation may be remotely observed and manually overridden using a network bus and a personal computer running man-machine interface software. Additionally, if one or more inventive stations (inventive control units) fail, the remainder of the system continues to function properly. The inventive algorithm may be applied as a backup algorithm to a damage reconfiguration system algorithm that uses network communications. In the event of a network failure the inventive control algorithm could stop using the algorithm requiring network communications, and begin using an inventive control algorithm based on the inventive stepped control algorithm so that the system would reconfigure if system damage occurred.

The component which has a sensing element on each side is generically referred to herein as a "valve/switch" or "valvular/switching means" or "switching means" or "valve means" or "valvular means," wherein such terms are intended to be synonymous. Each term is intended to denote any valve-like or switch-like device which accomplishes a similar purpose of regulating or changing flow or transmission of an entity which is passable therethrough, as by connecting, disconnecting, diverting, transferring, increasing apertural size, decreasing apertural size, adjusting apertural configuration, opening, closing, beginning operation, ceasing operation, etc. The "sensing element" on opposite sides of the switching means is intended to denote any sensing device which can accompany such switching means, such as that which includes a pressure sensor, a voltage sensor (e.g., voltmeter), current sensor (ampmeter), etc.

The inventive methodology is based on a stepped control logic sequence which is adaptable to different system types, sizes and architectures. This adaptability can be accomplished by changing, adjusting or otherwise appropriately setting the values used by the inventive stepped control logic. According to typical inventive embodiments, the inventive stepped control logic algorithm is entered when the sensing elements (e.g., pressure sensing, voltage sensing, current sensing, etc.) on each side of a valve/switch indicate a fault condition, and the fault condition has been determined to not be transient. The stepped control logic algorithm is exited and the valve/switch opens if the sensing elements on each side of the valve/switch indicate a normal condition.

Response to transient fault conditions is avoided through the use of a waiting period. Each step of the inventive control logic includes a waiting period followed by a testing period. According to many inventive embodiments, initially a special kind of waiting period referred to herein as a "transient" waiting period takes place. At the outset of the present invention's control logic sequence, when a fault condition is detected by the two sensing elements, the transient waiting period begins. If the end of this transient waiting period is reached and the sensing elements on each side of the valve/switch indicate a faulty condition throughout the transient waiting period, then the inventive algorithm causes the valve/switch to close and continues to the first step of the control logic. If the end of the transient waiting period is reached and the sensing elements on each side of the valve/switch do not indicate a fault condition throughout the waiting period, the valve/switch remains open and the first step of the inventive stepped control logic algorithm is not entered. If the sensing elements on each side of the valve/switch all indicate a simultaneous normal condition at any time during the transient waiting period, the transient waiting period is terminated, the valve/switch remains open, and the first step of the present invention's stepped control logic algorithm is not entered.

Each "step" of the inventive stepped control algorithm includes two time periods, viz., a "pre-test waiting period" and a "testing period" which follows the pre-test waiting period. The pre-test waiting periods all share similar attributes. The testing periods, as well, all share similar attributes. In fact, according to inventive embodiments providing for an initial "transient" waiting period precedent to the first step, the transient waiting period is analogous to each step's pre-test waiting period. In particular, if at any time during the waiting period there is simultaneity of normal condition indication by both sensing elements (i.e., there is absence of fault condition indication by at least one sensing elemement), at the conclusion of such waiting period the inventive algorithm switches from "fault mode" to "normal mode," according to which the valve/switch either remains in an open condition (in the case of the conclusion of a "transient" waiting period) or changes to an open condition (in the case of the conclusion of each "pre-test" waiting period).

The same inventive principal applies to the testing periods. In other words, if there concurrence by both sensing means of normalcy indication at any interval during either (i) a waiting period (whether a "transient" waiting period or a step's "pre test" waiting period) or (ii) a testing period, the inventive stepped control logic exits fault mode and enters normal mode. The absence of such concurrence results in the inventive stepped control logic moving on to the next stage or time period in the sequential scheme.

According to typical inventive practice, among the properties of the waiting period are the following: The waiting period is a time period which is not considered to have begun until a supply exists on one side of the valve/switch. The waiting period may be based on a limited random delay.

According to typical inventive practice, among the properties of the testing period are the following: The testing period is a time period during which a test is performed on the integrity of the system section isolated by the switch. The test comprises opening the valve/switch for a period of time and observing the sensing elements on either side of the valve/switch. If the end of the testing period is reached and the sensing elements do not indicate a normal reading, then the valve/switch should return to the closed position, and the algorithm should move on to the next step in the testing sequence.

The present invention's control logic may comprise one or more steps. Each progressive (or succeeding) step has a longer waiting period and a shorter testing period. According to many inventive embodiments, these periods may be based essentially on the following: First, determine the time required for the gate to open and the system to stabilize and call this value "o". Subsequently, determine the amount of time required for the gate to close and the system to stabilize and call this value "c". Subsequently, determine an appropriate amount of time to be used as a slight additional margin to be added on to "o" and "c" and call this value "m." Subsequently, set the stepped control logic values as follows: Set the step 1 pre-test minimum waiting period to a value greater than 2(c+m) and call this value p. The step one pre-test maximum waiting period will thus be 2p. The step two pre-test minimum waiting period will be 2p, and the step two pre-test maximum waiting period will be 3p. The step three pre-test minimum waiting period will be 3p, and the step three pre-test maximum waiting period will be 4p. The transient test waiting period will be 4c+m. The step one gate-open test period will be 3c+m. The step two gate-open test period will be 2c+m. The step three gate-open test period will be c+m. The gate-open test length (if used) within the fault isolation mode will be o+m.

In inventive practice, the values for m and p may need to be determined experimentally for a given system. The number of steps may need to be increased in systems with a large number of branches.

The present invention has been thoroughly tested on a compressed air distribution system. Installation and maintenance is relatively simple. The inventive algorithm handles sensor calibration variances, and its operation may be remotely observed and manually overridden using a network bus and a personal computer running man-machine interface software. Additionally, if one or more stations fail, the remainder of the system continues to function properly. The present invention's stepped control logic is adaptable for reconfiguration of almost any electro-mechanical distribution system.

If the current trend in the U.S. Navy continues it can reasonably be expected that, compared to today, Naval ships of the future will be much more highly automated and have significantly reduced manning, and thus will be much more heavily dependent upon automated network systems to replace sailors aboard ship. Perhaps future Naval ships will be endowed with the present invention, and beneficially so, the present invention's innovative software potentially represents the "failsafe" of these networked mechanical and electrical systems that are vital to a ship's survival.

The automated damage reconfiguration system may be applied to electrical distribution systems, including power grids and communication systems. In such systems, the inventive "station" (also referred to herein as the inventive "control unit") may comprise an electrical switch, a switch controller, a computer chip and voltage or current sensors on either side of the electrical switch. An electrical distribution system may use voltage sensors to determine the existence of a suitable source voltage on either side of the inventive station while the electrical switch is in an open state. While the electrical switch is in the closed state, the voltage sensors may be used to measure the voltage on either side of the inventive station and determine a fault condition when the voltage drops or rises to a value outside of a pre-determined range. Current sensors may also be used to determine that a fault condition exists when the current exceeds a certain limit. Using such equipment, any faulty branch of the system would become isolated without the expense of a network wiring installation.

The non-network dependent damage reconfiguration control logic discussed herein may be used as a backup algorithm for a damage reconfiguration system that normally uses network communications. In the event of a network failure the software may switch from "network communication" mode to a "network failure" mode which uses the non-network damage reconfiguration control logic. To determine whether the network is intact, a network token may be passed from one control unit to another in a predetermined order. As each inventive station passes the token on, a timer may be started, and if the token is not returned within a predetermined amount of time it will assume that a network failure exists. The algorithm will then change from "network communication" mode to a "network failure" mode and use the inventive "stepped control logic" to perform damage reconfiguration when necessary. Thus the damage reconfiguration system that normally uses network communications will continue to function in the event of a network failure. This method was successfully used in the compressed air system on which the inventive algorithm was tested. When a network failure occurred, each inventive station changed from "network communication" mode to "network failure" mode and the faulty sections of the pressurized air system were successfully isolated.

The accompanying drawings contain flowcharts which lend visual explanation to the inventive software. Appended hereto is the present invention's actual Neuron C program which was used in U.S. Navy testing. The algorithmic program contained in APPENDIX A and the flowcharts pertaining thereto are written in the event-driven language "Neuron C" which is used by the Neuron Chip made by Echelon Corporation. The present invention's flowcharts and algorithm represented herein may be adapted to any platform with the appropriate alterations; in the light of this disclosure, the ordinarily skilled artisan will be capable of practicing diverse embodiments of the present invention, including effectuating diverse inventive adaptations.

Other objects, advantages and features of this invention will become apparent from the following detailed description of the invention when considered in conjunction with the accompanying drawings.

BRIEF DESCRIPTION OF THE APPENDICES

The following appendices are hereby made a part of this disclosure:

Attached hereto marked APPENDIX A and incorporated herein by reference is an embodiment of a Neuron C computer program in accordance with the present invention. This computer program contains an inventive algorithm for automated damage reconfiguration using stepped control logic. This program enables the valves in a low pressure shipboard pressurized air delivery system to isolate leaks automatically. This program is also designed to communicate with a specific man-machine interface (MMI) program.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
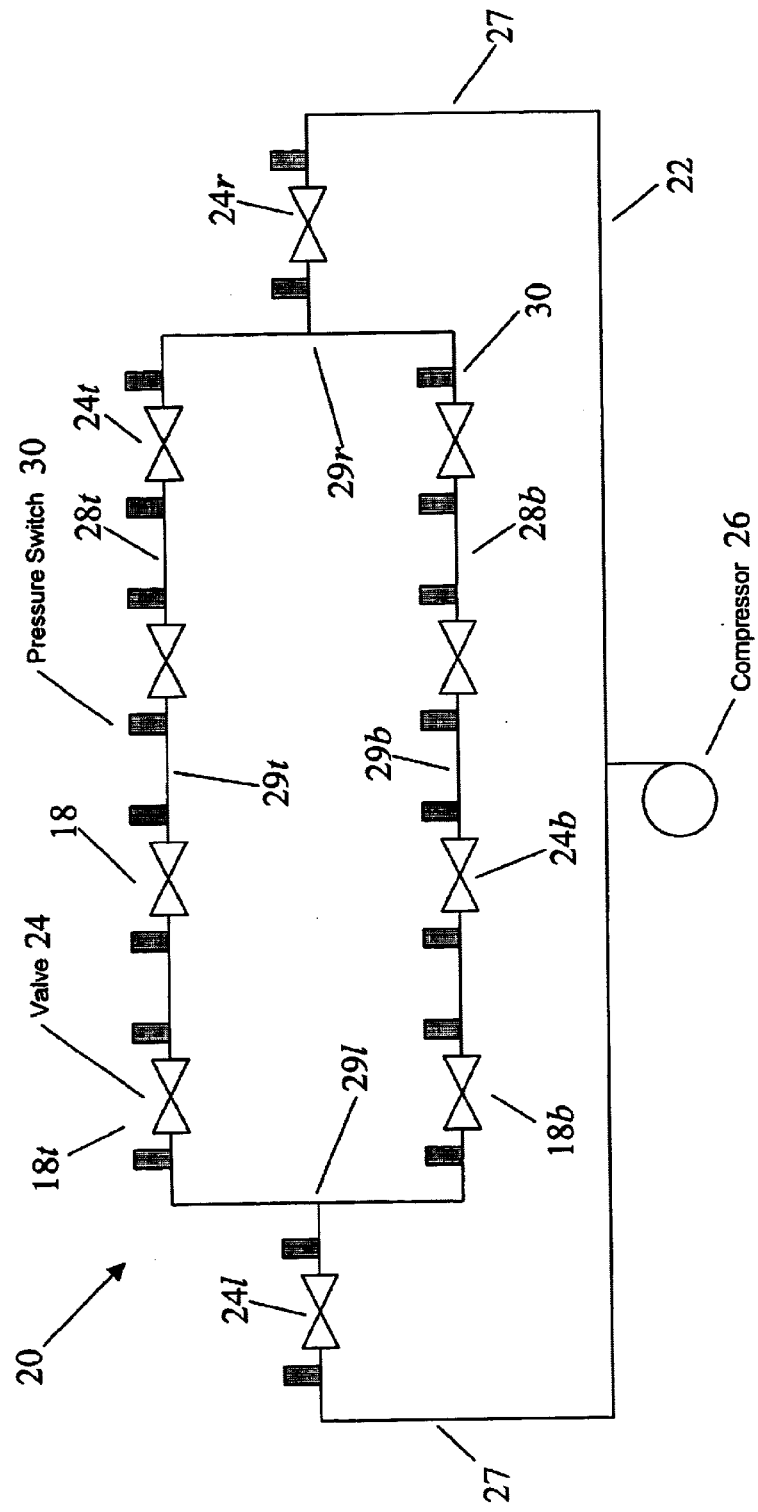
FIG. 1 is a schematic representation of the pressurized air delivery system which was used for inventive testing by the U.S. Navy.

The Pressurized Air Delivery System Used for Testing of the Present Invention FIG. 1 contains a schematic representation of the system 20 used to test the inventive software. Referring now to FIG. 1, the pressurized air delivery system 20 used for inventive software testing during the automation process contains piping 22 to deliver the air, and actuated ball valves 24 that are used as isolation valves to allow or block air flow/pressure throughout the system. Piping 22 can be considered to be divided into feedline 27, upper (top) branch 28$t$ and lower (bottom) branch 28$b$, which are approximately parallel to each other. Feedline 27 meets branches 28$t$ and 28$b$ at each of the two nodes 29$l$ and 29$r$.

Each "noninventive station" 18 can be considered to include a valve 24 and a corresponding pair of pressure switches 30. System 20 has two main branches, namely, top branch 28$t$ and bottom branch 28$b$. Top branch 28$t$ can be considered to include plural serial subbranches 29$t$. Bottom branch 28$b$ can be considered to include plural serial subbranches 29$b$. Subbranches 29 are in alternation with stations 18. In each branch 28, the corresponding stations 18 are in series with respect to each other. Stations 18$t$ are associated with top branch 28$t$, and stations 18$b$ are associated with bottom branch 28$b$.

Within branch 28$t$, stations 18$t$ are in series; within branch 28$b$, stations 18$b$ are in series. Stations 18$t$ vis-a-vis' stations 18$b$ may be described as being in a parallel relationship. Upper (top) valves 24$t$ are situated in top branch 28$t$. Lower (bottom) valves 24$b$ are situated in bottom branch 28$b$. Lefthand valve 24$l$ and righthand valve 24$r$ are situated in feedline 27 adjacent to nodes 29$l$ and 29$r$, respectively. System 20 is fed from an air compressor 26 via feedline 27 whereby the two automated isolation valves 24$l$ and 24$r$ feed the two parallel branches 28$t$ and 28$b$.

Each valve 24 has associated therewith, on opposite sides of the valve 24, a pair of pressure switches 30. A pressure switch is a device which converts pressure change into an electrical function. A pressure switch typically includes pressure sensing means such as a pressure sensing element. The pressure sensing element is that portion of a pressure switch which directly responds to changes in input pressure. The pressure sensing element typically includes a diaphragm, a membrane made of flexible material which is deflected by input pressure.

The Present Invention's Distributed Control Plan

Figure 2:
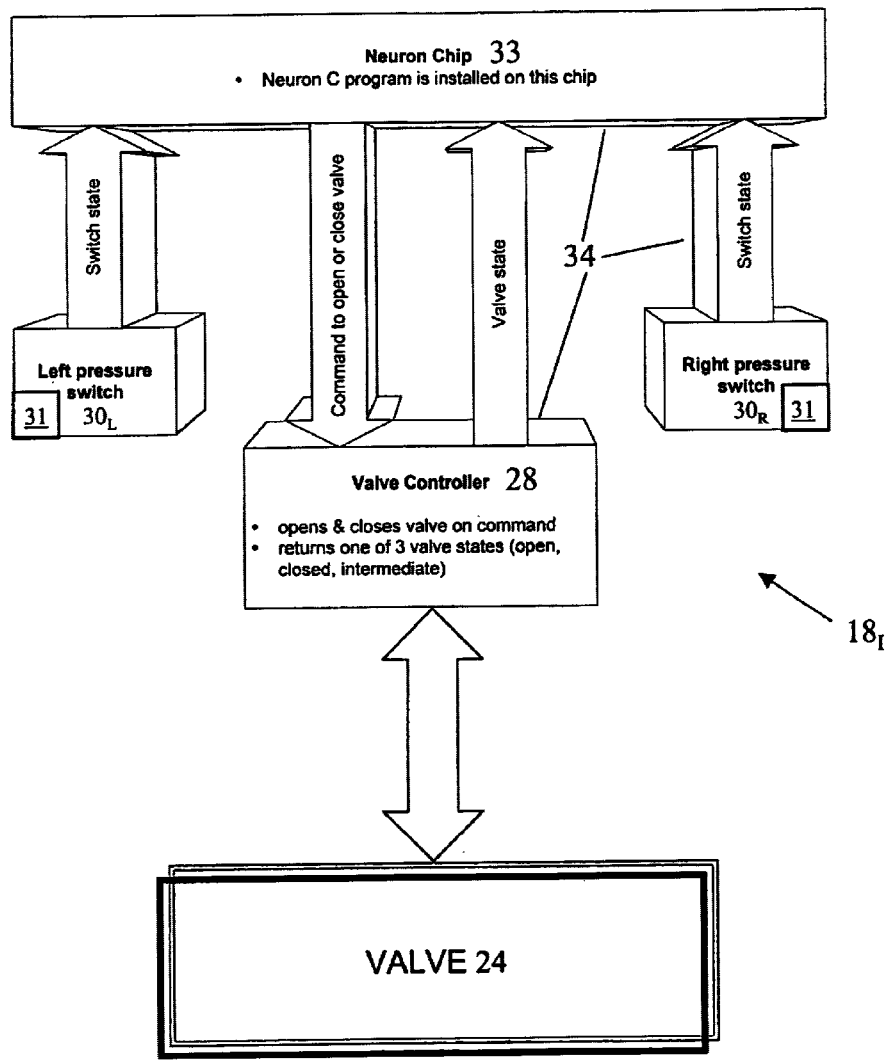
FIG. 2 is a schematic representation of how the pressurized air delivery system shown in FIG. 1 was inventively enhanced in such testing, particularly illustrating an inventive station wherein there are communications involving a valve controller, its associated two pressure switches, and a Neuron Chip which executes the inventive software.

Reference is now made to FIG. 2, which illustrates effectuation of the inventive logic in association with a single valve 24. To implement automation of system 20, each individual ball valve 24 is connected to a dedicated solenoidal valve controller 28. Pressure switches 30 are installed on each side of the valve 24 (to account for bi-directional flow). As shown in FIG. 2, each pressure switch 30 includes a pressure sensing element 31. A Neuron Chip 33 (manufactured by Echelon Corp., corporate headquarters located at 4015 Miranda Avenue, Palo Alto, Calif. 94304) executes the inventive software.

Every valve 24 in system 20 has, associated therewith, a valve controller 28, a pair of pressure switches 30 (one pressure switch 30 on each side of valve 24) and a computer chip 33. In other words, every valve 24 corresponds to its own inventive autonomous control circuit 34, which includes a chip 33, two pressure switches 30 and a controller 28. That is, in accordance with the present invention, an "inventive station" 18$_I$ not only includes a valve 24 and two pressure switches 30, but also includes a computer chip 33 and a valve controller 28; hence, each inventive station 18$_I$ effectively represents an independent control unit which includes a valve 24 and its inventive control circuit 34.

FIG. 2 describes the communications between the aforementioned components within a single, autonomous inventive station 18$_I$. Computer chip 33 is in communication with valve 24, valve controller 28, left pressure switch 30$_L$ and right pressure switch 30$_R$. Each valve controller 28 is solenoidal and therefore is only capable of implementing the open or closed states. The valve controllers 28 are each capable of reporting the following three positions—open, closed or intermediate.

The software installed on each Neuron Chip 33 controls the corresponding control circuit 34 system in both operational and reconfigurational modes, and is implemented using Neuron C. Neuron C is an event-driven programming language designed for Neuron Chips and based on ANSI C. Each Neuron Chip 33, along with its accompanying software and associated components, implements a corresponding control circuit 34.

Figure 3:
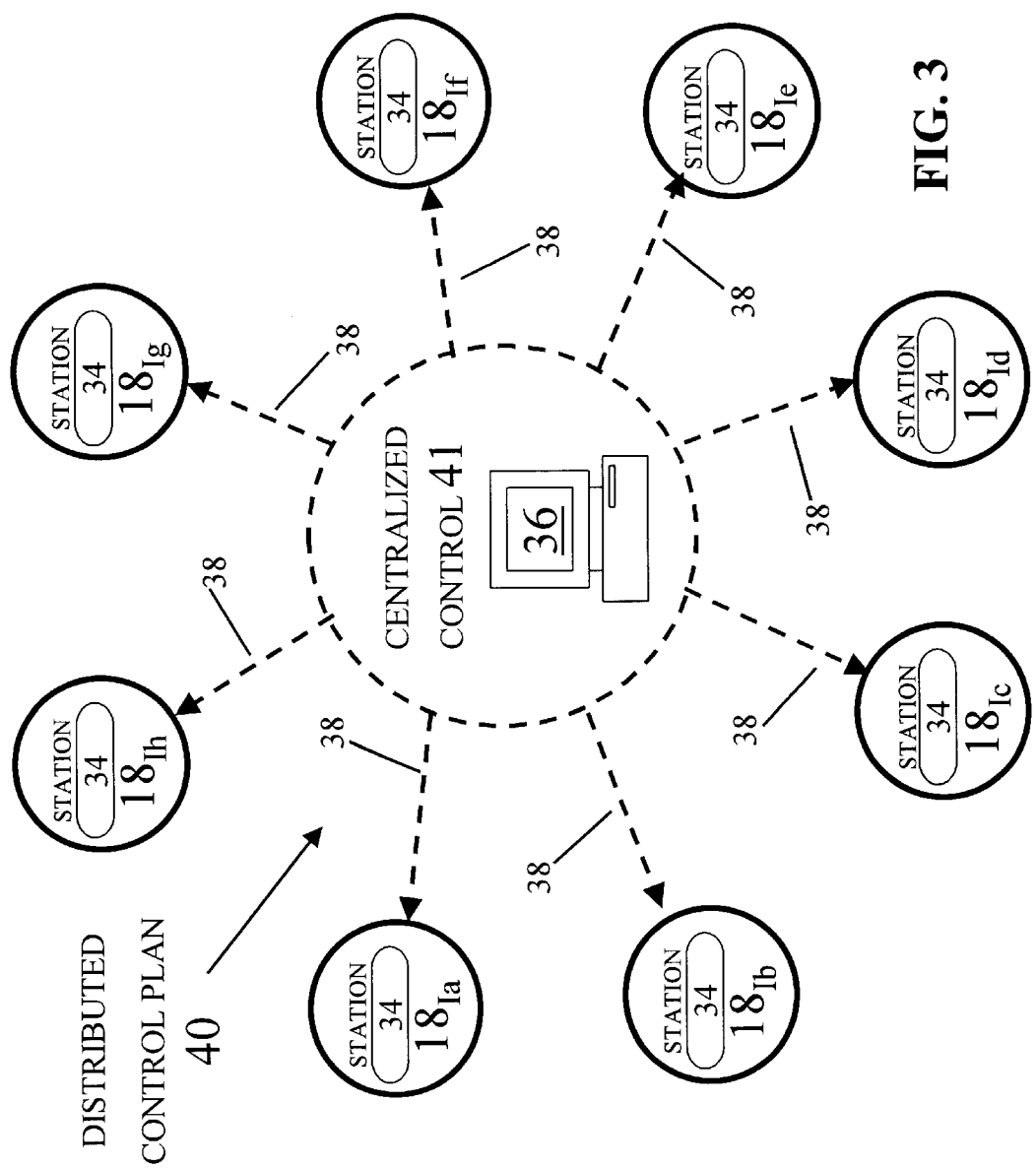
FIG. 3 is a schematic representation of an embodiment of an inventive distributed control plan/scheme, including depiction of how centralized control of such inventive distributed control plan/scheme may be effectuated using a human-machine interface.

With reference to FIG. 3, in accordance with inventive principles, pressurized air delivery system 20 is inventively enhanced with a distributed control plan 40. The overall system 20, when inventively enhanced by the present invention's distributed control plan 40, includes the combination of distributed individual control circuits 34. The present invention's distributed control plan 40 comprises the distributed individual control circuits 34—that is, the totality of the Neuron Chips 33 and accompanying software and associated components (including controller 28). In this iteration of the software, there is no communication between or among any of the Neuron Chips 33; nor is there any centralized control of the inventive distributed control scheme during automated reconfiguration. Each Neuron Chip 33 has its own inventive software. According to many inventive embodiments, every computer chip 33 is the same and has the same software.

Centralized control may nevertheless be desirable in practicing some embodiments of the present invention. As shown by dashed line in FIG. 3, centralized control 41 of the inventive distributed control plan 40 can be implemented using human-machine interface (HMI) software running on a separate processor 36 and connected to each Neuron Chip 33 via a network bus 38. The inventive software described herein responds to "manual override open," "manual override closed" and "reset and return to automatic mode" commands from an HMI. Each Neuron Chip contains identical code and no location information is contained in or added to the code. This will prevent loss of system function in the event of a disruption in network communications.

Operational Issues Pertaining to the Present Invention

It should be noted that, during the conception and testing of the present invention, certain operational issues were brought to light. In particular, several possible problems which could inhibit the successful reconfiguration of the pressurized air delivery system used for inventive testing were discovered and addressed.

According to a first possible scenario of this nature, the system is fed from more than one point, so the source side could be either side of the valve.

According to a second possible problem, since the present invention's Neuron Chips do not communicate, the possibility of two valves in parallel branches opening simultaneously must be taken into account. If both open simultaneously and only one is isolating a leak, the other Neuron Chip may falsely assume it is isolating a leak also and they both could remain closed.

A third problematical possibility which must be considered is that pressure switches may not all be in perfect calibration, and therefore the valves may not react simultaneously to system-wide pressure changes.

A fourth kind of problem involves cases in which a leak is slow enough to cause oscillations in the inventive stepped control system implemented by the inventive program. If a slow leak exists, a valve may close due to the pressure drop, and when it opens to determine if it isolating a leak, the air rushing into the adjacent branch of pipe may cause the pressure to rise above threshold for a period of time only to drop again. If the leak is slow enough, the inventive software may assume it is not isolating a leak and remain open until the pressure drops again, at which time another leak test is performed. The result would be a periodic opening and closing of the valve, i.e., oscillation.

All of these potential difficulties have been demonstrated to be handled successfully by the inventive software due to the inventive control logic methodology, viz., a "stepped control" scheme.

The Present Invention's Stepped Control Logic

A main conceptual aspect of the present invention is its stepped control logic. The inventive algorithm implements the inventive stepped control logic. The values used by the inventive control logic illustrated in FIG. 7 through FIG. 15 are designed for the reconfiguration of the compressible fluid or gas distribution system on which the algorithm was tested. These values will vary between systems using different piping sizes, different pressure tolerances, systems containing non-compressible fluids, or electrical systems. These values are relatively simple to determine.

According to the present invention, its stepped control logic is used to avoid erroneous fault assumptions by the automated damage reconfiguration algorithm when multiple branches exist in the physical system. Based on experimental data, the probability of two gates on different branches simultaneously performing a system integrity test is great. If the test performed by the gate that is isolating a fault causes a large part of the system to fail momentarily, then the other gate that has performed the test simultaneously but is not isolating a fault will assume erroneously that it is isolating a fault.

These types of conditions are avoided by using the inventive stepped control algorithm, which dramatically decreases the probability of any gate assuming a fault isolation mode erroneously. The present invention's stepped control logic also avoids oscillations that can occur in some systems where service loads become large enough to be considered borderline faults, or faults are small enough to be considered borderline service loads.

The Present Invention's Algorithm

Figure 4:
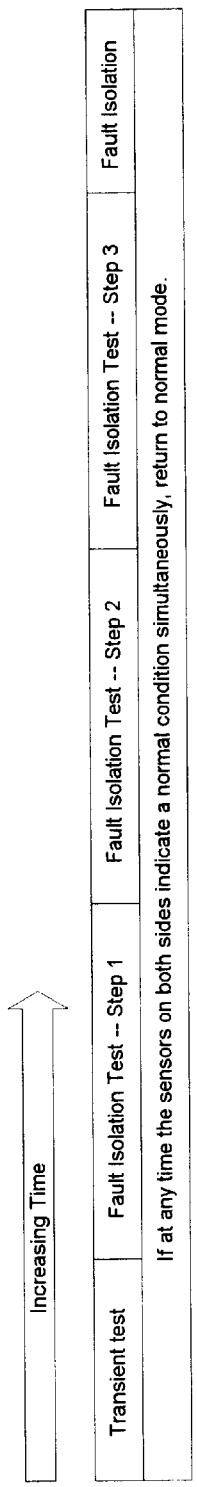
FIG. 4 is a schematic representation of the sequence pursuant to an inventive fault isolation test.
Figure 5:
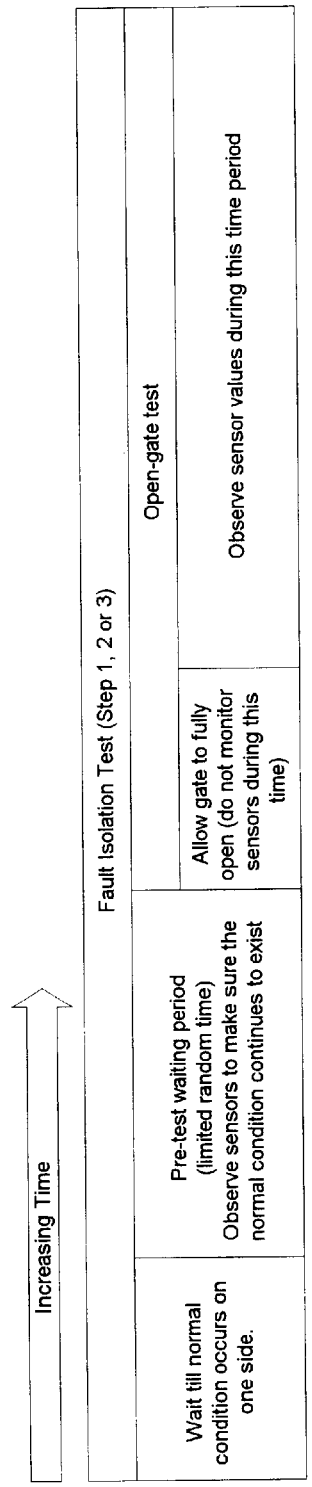
FIG. 5 is a schematic representation of a step of an inventive fault isolation test such as shown in FIG. 4.

Since the system on which the inventive algorithm was tested was a pressurized air distribution system, the description hereinbelow is mostly in terms of the valves and pressure switches used in that system, and a fault is referred to as a "leak." FIG. 4 provides a graphical overview of the inventive algorithm, while FIG. 5 describes more detail of the present invention's fault isolation tests, and FIG. 6 describes some relationships between inventive steps and duration (lengths of time). FIG. 7 through FIG. 15 together describe a detailed flowchart of the inventive algorithm. APPENDIX A is the actual inventive algorithm code as implemented in the Neuron C language.

The inventive algorithm begins in normal mode. When a fault is detected the inventive algorithm determines if the fault is a transient. If it is not a transient, the inventive algorithm enters "fault isolation test—step 1" mode. If the test is passed the inventive algorithm returns to normal mode, but if the test is failed then the inventive algorithm progresses to "fault isolation test—step 2" mode. Tests "2" and "3" are similar to test "1." If test "3" is failed the inventive algorithm enters "fault isolated" mode. In fault isolated mode the inventive algorithm assumes that the gate is isolating a fault. In the inventive algorithm used to automate the pressurized air distribution system, "fault isolated" mode includes options for checking every three minutes to test if the fault continues to exist. While this feature may be useful for many applications, it may easily be altered or deleted depending on its appropriateness for the given application.

The hardware installed in the pressurized air distribution system comprises pressure switches and two state valve controllers. When a leak occurs anywhere in the system, the pressure drops below a set threshold and the pressure switches change state. This change of state is detected by the present invention's Neuron Chip I/O, which in turn alters a variable used by the inventive software. The inventive software then determines if the valve it controls is isolating a leak, using the inventive stepped control logic. If the valve is isolating a leak it remains closed, and if it is not isolating a leak it returns to the open position.

To determine if the valve is isolating a leak, the valve is opened when the air pressure rises above the pressure switch threshold on either side of the valve. After the valve is opened, the pressure switches are monitored to see if the branch of pipe can be pressurized within the allotted time. If so, the inventive algorithm returns to normal mode. If not, the inventive algorithm continues through the remaining steps of the inventive stepped control logic to determine if the valve is actually isolating a leak.

The inventive stepped control algorithm is required to rule out cases in which a second valve isolating a leak has opened at the same time as the first valve, thus depressurizing the system and causing the valve to erroneously assume it is isolating a leak. This scenario was the impetus behind the invention disclosed herein. This scenario occurs with high probability in systems with multiple branches. While one possible solution would be to use more sophisticated sensors and continuously variable valves along with network communications to organize the opening and closing of valves to determine the leak location, all of these methodologies require a substantially larger monetary investment than the inventive methodology described herein. According to typical inventive practice, essentially the only tools used are simple pressure switches, two state valve controllers and standalone computer chips at each valve. The inventive algorithm is able to isolate faults in the system with this simple hardware.

Still referring to FIG. 2 and FIG. 3, when a leak occurs anywhere in the pressurized air delivery system 20, the pressure drops below a set threshold and the pressure switches 30 change state. This change of state is detected by the Neuron Chip 32 I/O (input/output), which in turn alters a variable used by the software. The software then determines if the valve 24 which the software controls is isolating a leak. If the valve 24 is isolating a leak it remains closed; if the valve 24 is not isolating a leak it remains open.

To determine if the valve 24 is isolating a leak, the valve 24 is opened when the air pressure rises above the pressure switch 30 threshold on either side of the valve 24. After the valve 24 is opened, the pressure switches 30 are monitored and a series of leak tests are performed to determine if the section of pipe previously isolated by the valve 24 contains a leak. If no leak exists, the valve 24 returns to the open position.

With reference to FIG. 7 through FIG. 15, the present invention's algorithm uses a stepped control scheme. The inventive software implements the inventive stepped control logic basically in the manner described in the following paragraphs.

When the pressure drops below threshold on both sides of the valve, the inventive software changes from "normal" mode to "transient" mode. In "transient" mode, the inventive software waits a period of time to determine if the pressure drop is merely a transient. If the pressure rises above threshold on both sides of the valve during this period of time, the inventive software immediately returns to "normal" mode. If, however, the end of the time period is reached and the pressure has not risen above threshold on both sides of the valve, the valve is closed and the inventive software mode changes from "transient" mode to "leak test 1" mode.

In "leak test 1" mode, the inventive software waits for the pressure to rise above threshold on either side of the valve and then waits for a limited pseudo-random "pre-open" time. This pseudo-random "pre-open" time is a pseudo-random time with upper and lower limits. If the pressure drops below threshold on both sides of the valve during the "pre-open" waiting period, the inventive software returns to the beginning of "leak test 1" mode. If the pressure rises above threshold on both sides of the valve during the "pre-open" waiting period, the valve is opened and the inventive software returns to "normal" mode.

If the end of the "pre-open" waiting period is reached and the pressure has remained above threshold on one side of the valve throughout the waiting period, the valve is opened. The pressure switch values are then monitored in the following manner to determine if a leak is being isolated by the valve. Three timers are set by the inventive software, as follows: (a) a "valve opening" timer to allow the valve to open completely before the leak analysis begins; (b) A delay to account for the occurrence of any transient normal pressures and thus avoiding oscillations in the stepped control algorithm; and, (c) a "test" timer which determines the length of time the valve is opened to perform the leak test.

If the end of the leak test is reached and the pressure has dropped, there may be a leak. However, due to the existence of multiple branches, another valve that is isolating a leak on another branch may have opened at the same time, causing the pressure to drop in the entire system and causing the inventive program on the valve to fail the leak test. Therefore, the inventive program then progresses to "leak test 2" mode and the leak test procedure is repeated. If "leak test 2" fails then the program moves to "leak test 3" mode and the test is again repeated. If "leak test 3" is failed, it is assumed there is a leak and the valve is locked closed. After the leak is fixed, the inventive program can be reset to normal mode manually, or will reset automatically.

The limits of the "pre-open" pseudo-random timers are set differently for each leak test. They are progressively lengthened as the leak tests are stepped through. This lessens the probability of valves in multiple branches opening simultaneously.

The "test" timer lengths are progressively shortened as the leak tests are stepped through. This prevents a valve that is performing "leak test 1" from causing a valve in normal mode to progress to "leak test 1" mode, or a valve in "leak test 2" or "leak test 3" mode from causing a valve in "leak test 1" mode or "leak test 2" mode, respectively, to fail the leak test. For example, if the delay to check for transients in normal mode is set to 8 seconds then the "test" time that a valve will remain open to perform the leak test will be 6, 4 and 2 seconds for leak tests 1, 2 and 3 respectively. For the "pre-open" pseudo-random timers to avoid overlap between test, the low limits would be set to 5, 10 and 15 and the high limits would be set to 10, 15 and 20 for leak test 1, 2 and 3 respectively.

FIG. 4 shows the overall design of the inventive algorithm with respect to time. When the sensors on each side of the gate both indicate a fault state, the inventive software waits for a period of time to determine if the fault is a transient. The transient test also prevents a given node from entering "Fault Isolation Test—Step 1" mode as a result of another node performing a "Gate Open Test". FIG. 5 shows the detail of the fault isolation tests. FIG. 6 shows the important time relationship(s) between (among) the steps of the fault isolation tests which are at the heart of the inventive stepped control logic.

Both sensors are monitored continually during the transient test wait period. If at any time during the waiting period both sensors indicate a normal condition simultaneously, the waiting period timer is ceased and the inventive software returns to normal mode. If the end of the waiting period is reached and the sensors did not both indicate a normal condition simultaneously at any time during the waiting period, it is assumed that the fault is not a transient and the gate may be isolating a faulty system branch. Therefore, the software enters "fault isolation test—step 1" mode.

In "fault isolation test—step 1" mode, the inventive algorithm waits for any one of the two sensors to indicate a normal state. There is no limit to the length of this waiting period, because there is no sense in opening the valve to perform a fault test if there is no pressure on either side of the valve to perform the test with. When one of the pressure sensors indicates a normal state, a pre-test waiting period timer is started. The length of this time is a limited random length. The random length lessens the probability of two valves opening simultaneously to perform fault tests. Particularly with reference to FIG. 6, the stepped control algorithm prevents valves in the higher steps from causing valves in the lower steps to erroneously assume they are isolating a fault.

During the limited random pre-test waiting period, the sensors are continually observed. If at any time the sensor changes state and does not continue to indicate a normal state, the algorithm cancels the timer and returns to the waiting period at the beginning of the fault isolation test. If the end of the limited random waiting period is reached and the sensor continues to indicate a normal state throughout the pre-test waiting period, the valve is opened to perform the actual open-gate test. During the beginning of this open-gate test, the inventive algorithm waits for a period of time to allow the valve to fully open and for any transient normal pressures to subside. These transient normal pressures tend to occur when one branch of pipe is feeding another branch of pipe. The pressurized pipe acts as a tank which often raises the pressure in the beginning length of the pipe branch being fed up to normal pressure very rapidly, but then is quickly depleted of its pressure as the air rushes into the remainder of the branch. Therefore, a timer is used to avoid erroneous sensor readings during this time period.

When the timer has expired, the sensors will be monitored. As stated earlier herein, if both sensors indicate a normal condition simultaneously at any time during (i) the transient test, or (ii) the fault isolation tests, or even (iii) the final fault isolation mode, the inventive algorithm will return to normal mode and the valve will open if it is not already open.

If the end of the open-gate testing time period is reached and both pressure switches do not indicate a normal condition, the inventive algorithm will enter the second step of the stepped control logic. The second and third steps are almost identical to the first. The only differences are the lengths of the pre-test waiting period and the open-gate test.

The Present Invention's Time Relationships among Control Logic Steps

Figure 6:
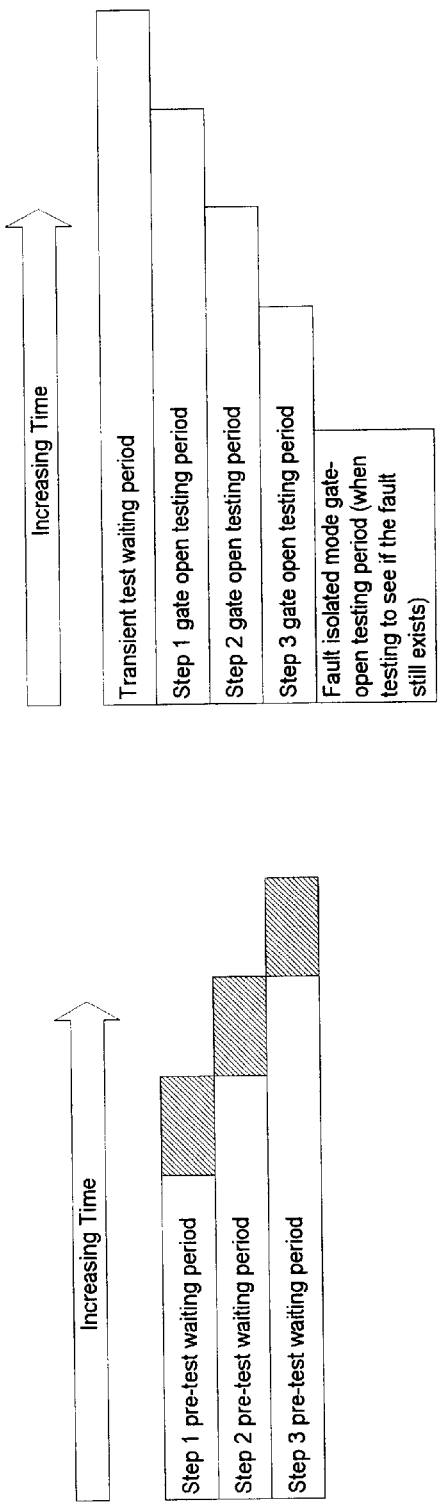
FIG. 6 is a schematic representation of the time relationships among the steps of an inventive fault isolation test such as shown in FIG. 4.
Figure 7:
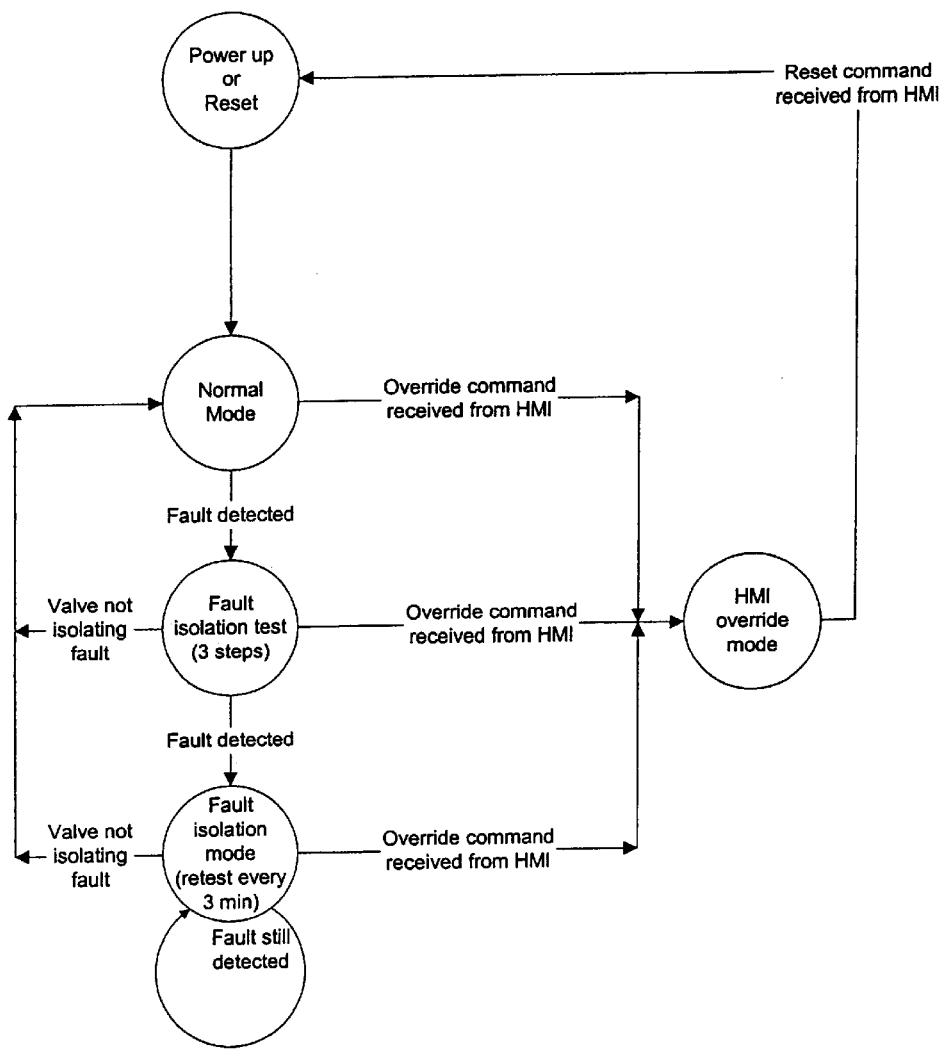
FIG. 7 is a flow diagram representing an overview of an algorithm in accordance with the present invention, more specifically an overview of an inventive embodiment of a pressurized air system Neuron C code.
Figure 8:
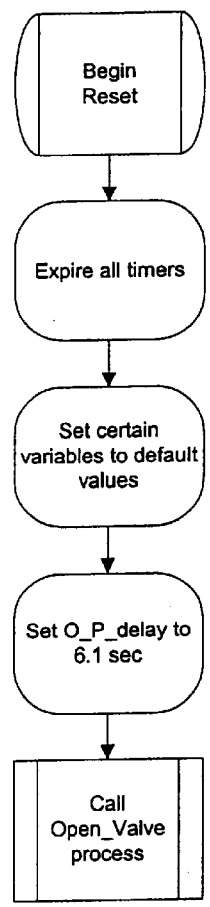
FIG. 8 is a flow diagram representing the reset process (also performed when inventive station is powered on) pertaining to the embodiment shown in FIG. 2.
Figure 9:
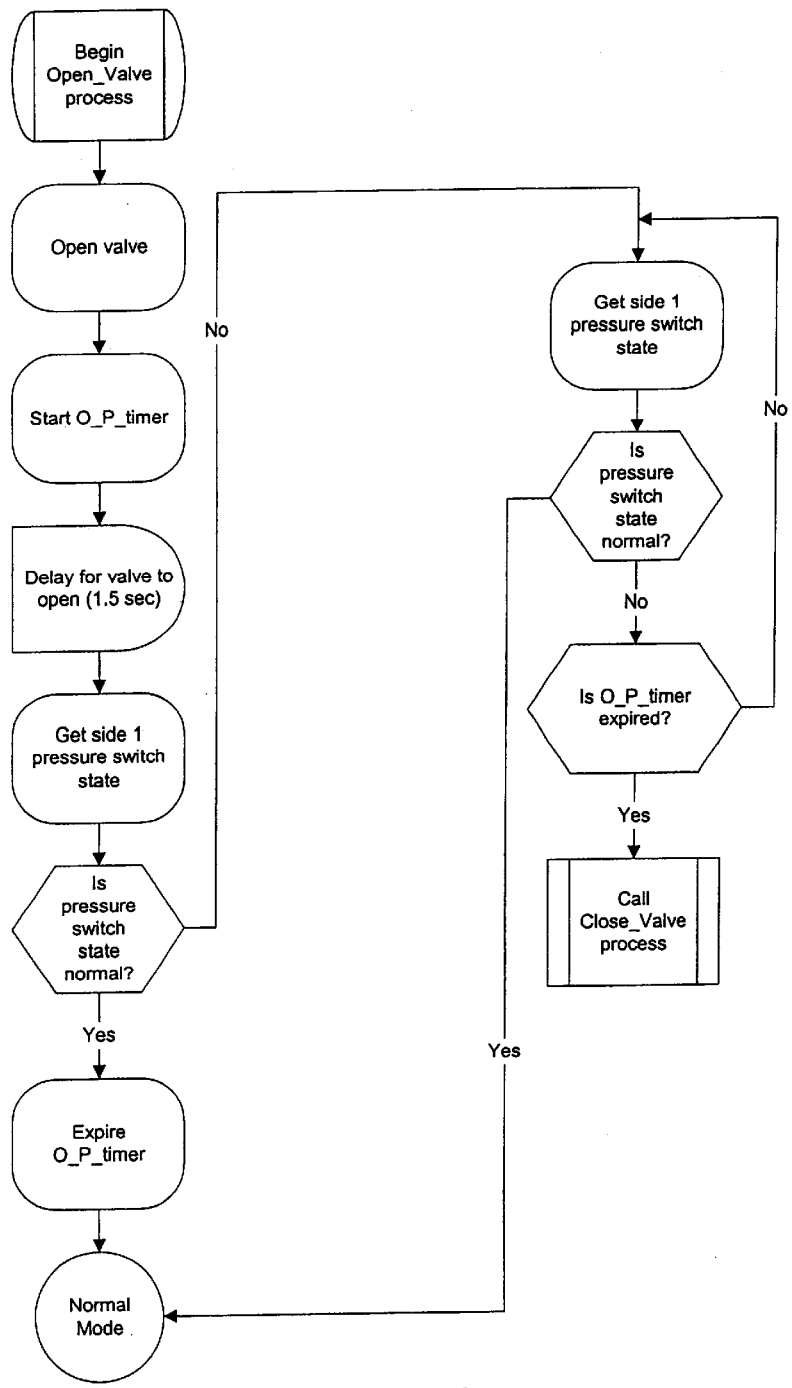
FIG. 9 is a flow diagram representing the open valve process pertaining to the embodiment shown in FIG. 2.
Figure 10:
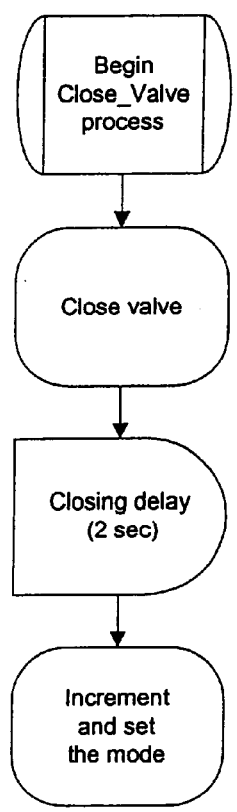
FIG. 10 is a flow diagram representing the close valve process pertaining to the embodiment shown in FIG. 2.
Figure 11:
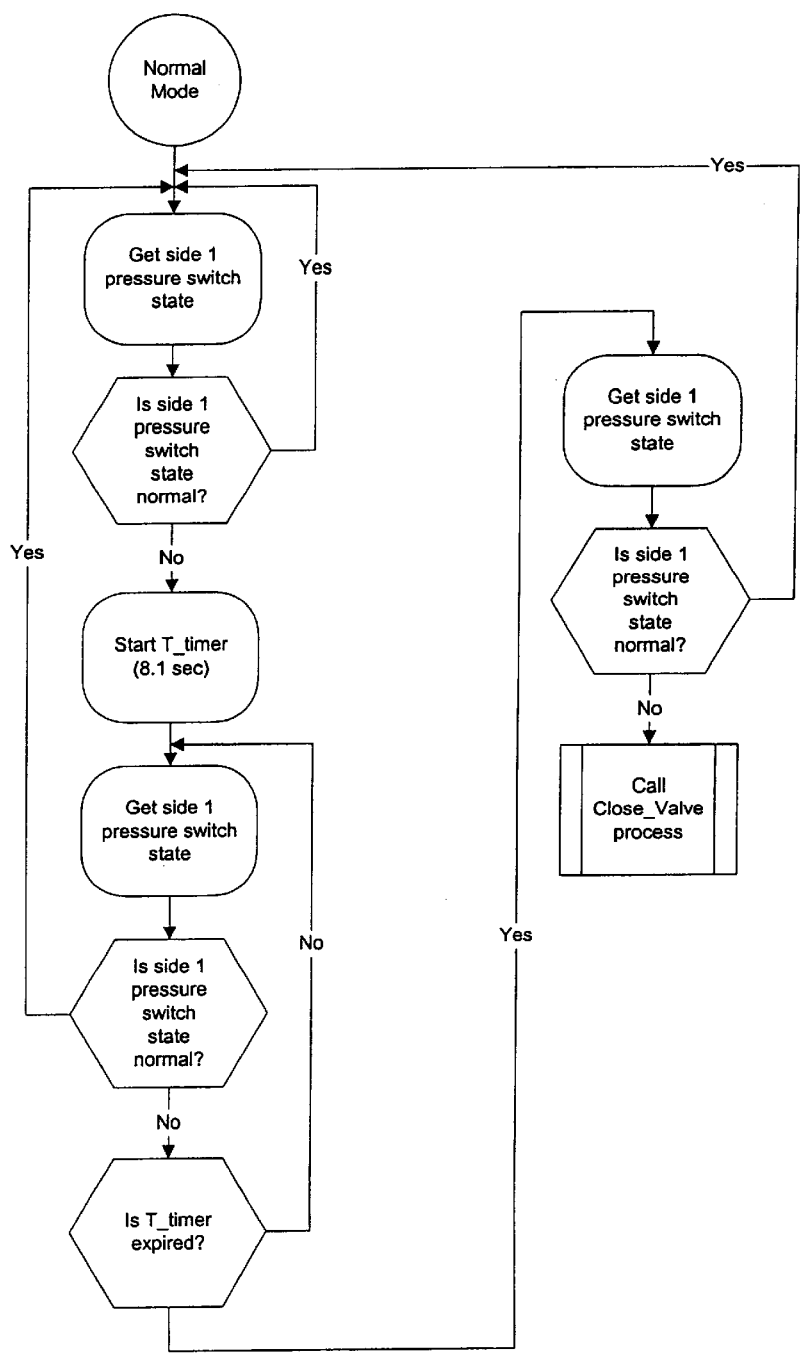
FIG. 11 is a flow diagram representing the normal mode pertaining to the embodiment shown in FIG. 2.
Figure 12:
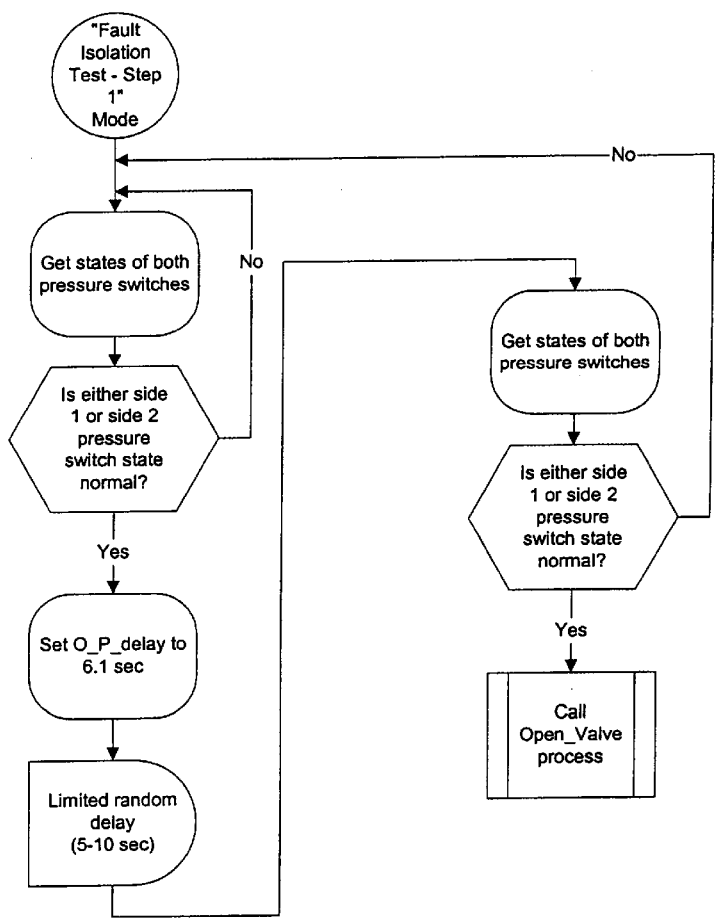
FIG. 12 is a flow diagram representing the leak test I mode pertaining to the embodiment shown in FIG. 2.
Figure 13:
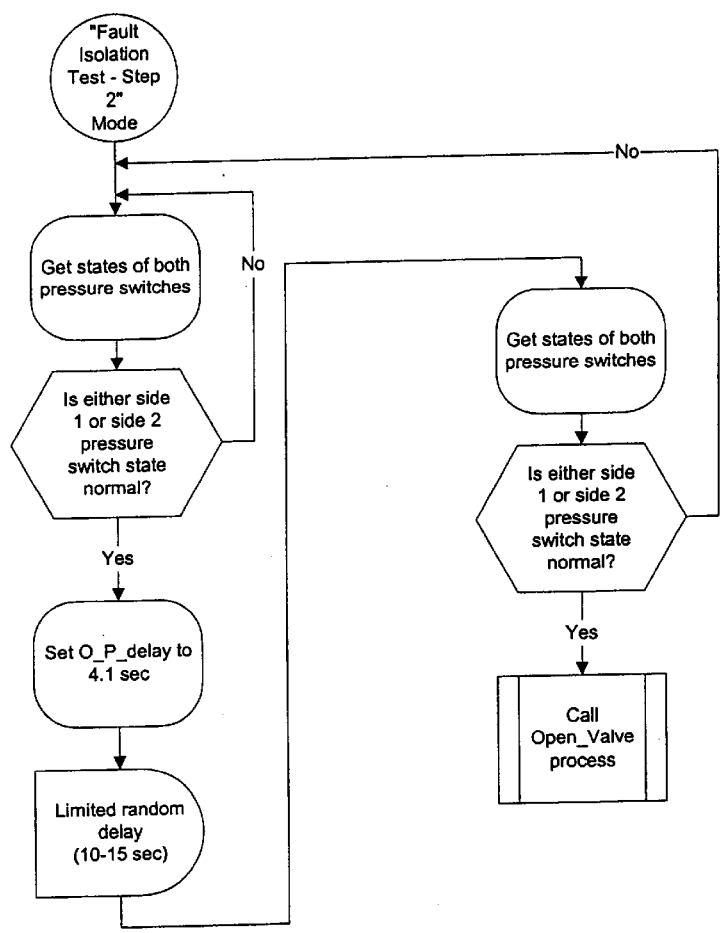
FIG. 13 is a flow diagram representing the leak test 2 mode pertaining to the embodiment shown in FIG. 2.
Figure 14:
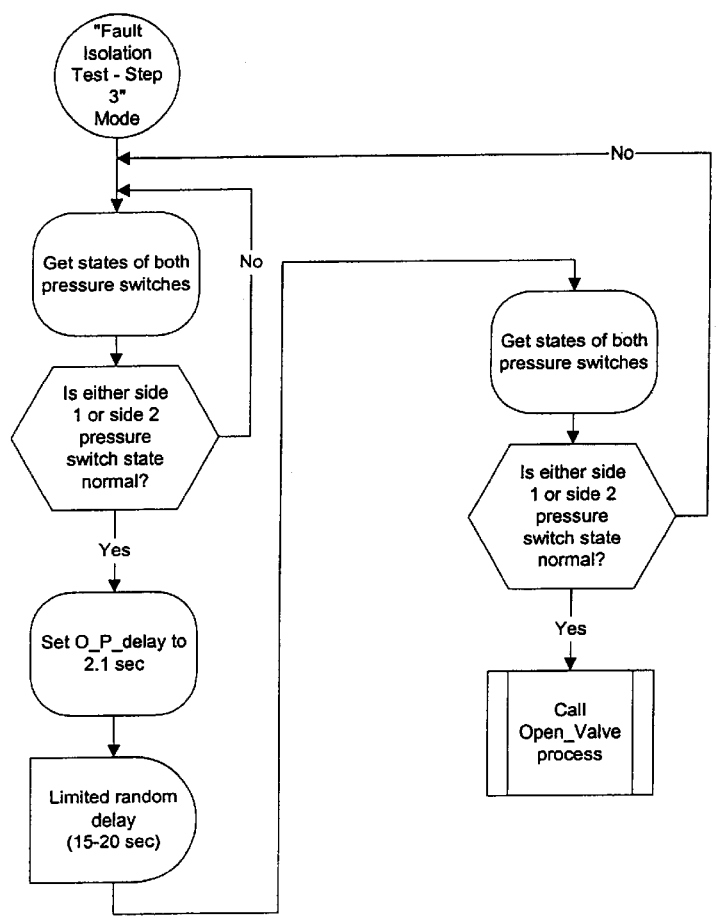
FIG. 14 is a flow diagram representing the leak test 3 mode pertaining to the embodiment shown in FIG. 2.
Figure 15:
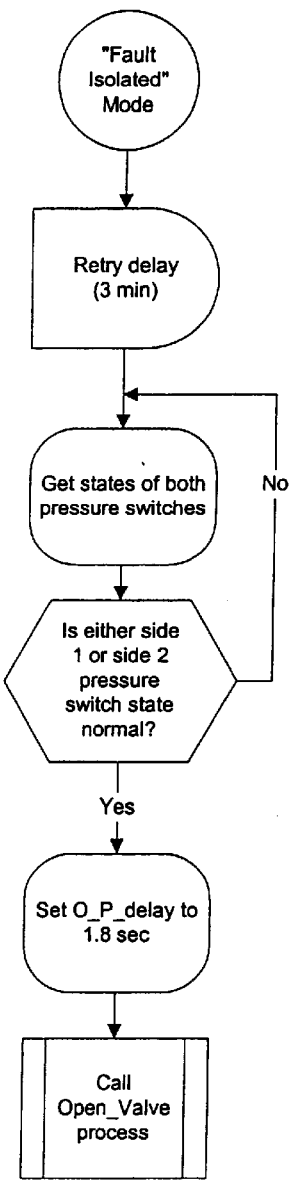
FIG. 15 is a flow diagram representing the halt mode pertaining to the embodiment shown in FIG. 2.

FIG. 6 illustrates the important relationship between the lengths of the limited random pre-test waiting periods, and the transient and open-gate testing periods. The shaded areas indicate the corresponding time region wherein the limited random waiting period may end. Note that the limited random waiting period ending regions do not overlap between tests. Also note the transient delay is longer than the "step 1" gate open testing period. This means that a node performing any gate open test will not cause another node in normal mode to reach the end of the transient period and enter "step 1" mode. That is, none of the gate open testing periods last longer than the transient test waiting period. It is also noted that, in progressing from "step 1" to "step 3," the open gate tests become shorter in duration.

To further illustrate the present invention's logic, consider a system with multiple branches such as the system shown in FIG. 1. Let us assume that the left-most valve $24t_L$ in the top branch $28t$ is isolating a fault on its right side and that the left-most valve $24b_L$ in the bottom branch $28b$ is not isolating a fault. Also for the purposes of this example, let us assume that the top left-most valve $24t_L$ is in fault isolation test "step 2" mode and that the bottom left-most valve $24b_L$ is in fault isolation test "step 1" mode. Let us assume that the fault has caused the system 20 to depressurize rapidly, and that all of the valves 24 have closed. After the main valve $24l$ feeding the left side opens and the top branch $28t$ has pressurized, the left side sensors $31t_L$ and $31b_L$, respectively, corresponding to both the upper and lower valves $24t_L$ and $24b_L$ will indicate a normal pressure. The pre-test limited random delay will start simultaneously on both valves $24t_L$ and $24b_L$. Normally, due to the fact that these two valves $24t_L$ and $24b_L$ are in different steps of the fault isolation test, the ends of the pre-test limited random delays could not possibly occur at the same time. Therefore, each valve would open in turn; the top valve $24t_L$ would continue to detect the fault and move on to "step 3," and the bottom valve $24b_L$ would return to normal mode.

However, let us assume that the branch of pipe leading to the bottom valve $24b_L$ is longer by just the right amount and therefore takes longer to pressurize. In this case, the end of the pre-test waiting period could be reached at the same time by both valves $24t_L$ and $24b_L$. While this is improbable due to the fact that the length of the delay is random, it is possible. Let us assume that valves $24l_T$ and $24l_B$ then both open at the same time. Because the time length of the "step 2" gate-open test is shorter than the time length of the "step one" gate-open test, the upper valve $24l_T$ which is in "step 2" mode would close before the lower valve $24l_B$ (in "step 1" mode) reached the end of its gate-open test period.

The difference between the lengths of the gate-open tests must be long enough to allow pressurization of the system 20. If the upper valve $24l_T$ closed and the gate-open test for lower valve $24l_T$ did not last long enough for the branch $28t$ to repressurize after the upper valve $24t_L$ closed, the inventive algorithm on the lower valve $24b_L$ would then move on to "step 2" erroneously. Note that the proper difference between the lengths of the gate-open tests is relatively simple to determine in accordance with inventive principles.

The worst scenario would be if the bottom valve $24b_L$ opened and before the section of branch of pipe to its right, subbranch $29t_l$ could be pressurized enough to cause its sensors to both indicate a normal condition; the top valve $24t_L$ would thus open to perform its fault isolation test. In this case it is likely that the leak near the top valve $24t_L$ would cause the system to depressurize before the bottom valve $24b_L$ reached the end of the opengate test, and the bottom valve $24b_L$ would then move on to the next fault isolation test step. Note that, generally in inventive practice, three steps are used to prevent scenarios such as this from causing the inventive algorithm to enter the final "fault isolated" mode erroneously. This inventive methodology has been thoroughly tested and demonstrated to work with multiple branches and multiple leaks with multiple service loads.

Returning to FIG. 6, note that the gate open testing period begins at the end of the limited random pre-test waiting period. The end of the limited pre-test waiting period may occur at any time within the limits indicated by the borders of the shaded area. Also, the time differences between/among the tests on the right side of FIG. 6 are important but simple to determine.

The Present Invention's Determination of the Stepped Control Logic Values

The following is a step-by-step procedure that may be used, in accordance with the present invention, to determine the appropriate values to plug into the present invention's stepped control logic to operate it on any system.

Determine the time required for the gate to open and the system to stabilize and call this value "o". Then, determine the amount of time required for the gate to close and the system to stabilize and call this value "c". Next, determine an appropriate amount of time to be used as a slight additional margin to be added on to "o" and "c" and call this value "m".

Then, set the present invention's stepped control logic values as follows:

(i) Set the "step 1" pre-test minimum waiting period to a value greater than $2(c+m)$ and call this value "p."

(ii) The "step 1" pre-test maximum waiting period will then be 2p.

(iii) The "step 2" pre-test minimum waiting period will be 2p, and the "step 2" pre-test maximum waiting period will be 3p.

(iv) The "step 3" pre-test minimum waiting period will be 3p, and the "step 3" pre-test maximum waiting period will be 4p.

(v) The transient test waiting period will be $4c+m$.

(vi) The "step 1" gate-open test period will be $3c+m$.

(vii) The "step 2" gate-open test period will be $2c+m$.

(viii) The "step 3" gate-open test period will be $c+m$.

(ix) The gate-open test length (if used) within the fault isolation mode will be $o+m$.

The values for m and p may need to be determined experimentally for a given system.

The number of steps may need to be increased in systems with a large number of branches. In an inventive stepped control algorithm with n gate-open tests, the following values would be used. The arithmetic progression followed by the transient and gate-open testing periods is $\{(n+1)c+m, n*c+m, (n-1)c+m, (n-2)c+m, \ldots, c+m, o+m\}$. Thus the transient test waiting period would be $(n+1)c+m$, the "step 1" gate-open testing period would be $n*c+m$, the "step 2" gate-open testing period would be $(n-1)c+m$ and the remaining steps would follow, becoming progressively shorter as per the arithmetic progression. The final step gate-open period would be $c+m$, and the $o+m$ value is of course only used if a gate-open test is performed in the "fault isolated" mode. The arithmetic progression followed by the pre-test waiting periods lower limits is $\{p, 2p, 3p, \ldots, np\}$ and the higher limit is $\{2p, 3p, 4p, \ldots, (n+1)p\}$, where p is greater than $2(c+m)$.

Using these arithmetic progressions, the present invention's step control logic may be adapted to an electro-mechanical distribution system with many branches. The number of steps required and the values for m and p are system-dependent and may need to be determined experimentally. In the light of this disclosure, such determinations will be well within the capability of the ordinarily skilled artisan who practices the present invention.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. An apparatus for use in association with an electro-mechanical distribution system characterized by at least one branch, a flowable entity for being distributed by said electro-mechanical distribution system to some degree by way of said at least one branch, at least one source of said entity, and at least one station for affecting distribution of said entity, said at least one station being in communication with said at least one branch, each said station including switching means and a pair of sensing means on both sides of said switching means; said apparatus being for isolating at least one fault condition within said electro-mechanical distribution system, said apparatus comprising at least one machine having a memory, each said machine being connected with a said station, each said machine receiving input from the corresponding pair of said sensing means, each said machine effectuating control with respect to the corresponding said switching means, each said machine containing a data representation of a stepped control logic scheme which defines said effectuating control and which relates to the corresponding pair of said sensing means and the corresponding said switching means, said stepped control logic scheme including a normal mode and a fault mode, wherein the indication of a fault condition by at least one of the corresponding pair of said sensing means at any time during said normal mode results in a change from said normal mode to said fault mode, and wherein the simultaneity of indication of a normal condition by both of the corresponding pair of said sensing means at any time during said fault mode results in a change from said fault mode to said normal mode.

2. An apparatus as recited in claim 1, wherein:

said fault mode includes at least one step;

each said step includes a pre-test waiting period and a testing period which follows said pre-test waiting period;

during said pre-test waiting period said switching means is in a closed condition;

during said testing period said switching means is in an open condition;

if it does not occur at any time during said pre-test waiting period that both of the corresponding pair of said sensing means simultaneously indicate a normal condition, said switching means is rendered in an open condition at the conclusion of said pre-test waiting period, whereupon said testing period commences; and if it does not occur at any time during said testing period that both of the corresponding pair of said sensing means simultaneously indicate a normal condition, said switching means is rendered in a closed condition at the conclusion of said testing period.

3. An apparatus as recited in claim 2, wherein:

if it occurs at any time during said pre-test waiting period that both of the corresponding pair of said sensing means simultaneously indicate a normal condition, said switching means is rendered in an open condition at the conclusion of said pre-test waiting period, whereupon said normal mode resumes; and if it occurs at any time during said testing period that both of the corresponding pair of said sensing means simultaneously indicate a normal condition, said switching means remains in an open condition at the conclusion of said testing period, whereupon said normal mode resumes.

4. An apparatus as recited in claim 2, wherein said entity is a fluid.

5. An apparatus as recited in claim 2, wherein said entity is electrical current.

6. An apparatus as recited in claim 2, wherein:

said fault mode includes a transient test waiting period which precedes the first said step;

if both of the corresponding pair of said sensing means simultaneously indicate a fault condition, said transient test waiting period commences;

during said transient test waiting period said switching means remains in an open condition; and if it does not occur at any time during said transient test waiting period that both of the corresponding pair of said sensing means simultaneously indicate a normal condition, said switching means is rendered in a closed condition at the conclusion of said transient test waiting period, whereupon the first said pre-test waiting period commences.

7. An apparatus as recited in claim 2, wherein:

said at least one step is at least two sequential steps;

each said sequential step except the last said step is followed by a said pre-test waiting period of the succeeding said step; and beginning the second said sequential step, the commencement of each said pre-test waiting period is considered to be delayed, following the conclusion of the preceding said testing period, until one of the corresponding pair of said sensing means indicates a normal condition.

8. An apparatus as recited in claim 2, wherein:

said at least one step is at least two sequential steps;

each said sequential step except the last said sequential step is followed by a said pre-test waiting period of the succeeding said sequential step;

beginning the second said sequential step, each said pre-test waiting period is longer than the preceding said pre-test waiting period; and beginning the second said sequential step, each said testing period is shorter than the preceding said testing period.

9. An apparatus as recited in claim 8, wherein:

said fault mode includes a transient test waiting period which precedes the first said sequential step;

if both of the corresponding pair of said sensing means simultaneously indicate a fault condition, said transient test waiting period commences;

during said transient test waiting period said switching means remains in an open condition; and if it does not occur at any time during said transient test waiting period that both of the corresponding pair of said sensing means simultaneously indicate a normal condition, said switching means is rendered in a closed condition at the conclusion of said transient test waiting period, whereupon the first said pre-test waiting period commences.

10. An apparatus as recited in claim 9, wherein said at least two sequential steps are three said sequential steps, and wherein the duration of said transient test waiting period, the durations of said pre-test waiting periods, and the durations of said testing periods, in principle are based on the following:

the amount of time required for said switching means to be rendered in an open condition and for said system to stabilize is designated "o";

the amount of time required for said switching means to be rendered in a closed condition and for said system to stabilize is designated "c";

an incremental period to be added onto each of o and c is designated "m";

the expression 2(c+m) is designated "p", wherein p is equal to the value 2(c=m);

said pre-test waiting period of the first said sequential step will be equal to a value of no less than p and no greater than 2p;

said pre-test waiting period of the second said sequential step will be equal to a value of no less than 2p and no greater than 3p;

said pre-test waiting period of the third said sequential step will be equal to a value of no less than 3p and no greater than 4p;

said transient test waiting period will be equal to the value (4c+m);

said testing period of the first said sequential step will be equal to the value (3c+m);

said testing period of the second said sequential step will be equal to the value (2c+m); and said testing period of the third said sequential step will be equal to the value (c+m).

11. An apparatus as recited in claim 9, wherein the duration of said transient test waiting period, the durations of said pre-test waiting periods, and the durations of said testing periods, in principle are based on the following:

the amount of time required for said switching means to be rendered in an open condition and for said system to stabilize is designated "o";

the amount of time required for said switching means to be rendered in a closed condition and for said system to stabilize is designated "c";

an incremental period to be added onto each of o and c is designated "m";

the expression 2(c+m) is designated "p", wherein p is equal to the value 2(c+m); the total number of said sequential steps is designated "$n_T$"; each said sequential step is designated the "n"th said sequential step, wherein "n" corresponds to the sequential number of said sequential step;

said pre-test waiting period of the "n"th said sequential step will be equal to a value of no less than np and no greater than (n+1)p;

said transient test waiting period will be equal to the value $[(n_T+1)c+m]$; and said testing period of the "n"th said sequential step will be equal to the value $[(n_T-n+1)c+m]$.

12. A computer program product comprising a computer useable medium having computer program logic recorded thereon for enabling computer means to ascertain a state of defectiveness relating to a station in an electro-mechanical system for moving a flowable entity, said station affecting the movement of said entity, said station including the combination of switching means and two sensing means, said two sensing means being on opposite sides of said switching means, said computer program logic comprising:

means for enabling said computer means to establish a normal mode of said station and a fault mode of said station;

means for enabling said computer means to appreciate the indication of a normal condition of said station by either of said two sensing means;

means for enabling said computer means to appreciate the indication of a fault condition of said station by either of said two sensing means;

following the indication of a fault condition by at least one of said two sensing means at any time during said normal mode, means for enabling said computer means to effect a change regarding said station from said normal mode to said fault mode; and following the simultaneous indication of a normal condition by both said sensing means at any time during said fault mode, means for enabling said computer means to effect a change regarding said station from said fault mode to said normal mode.

13. The computer program product according to claim 12, wherein said entity is selected from the group consisting of fluid and electrical current.

14. The computer program product according to claim 12, wherein said computer program logic further comprises:

means for enabling said computer means to establish at least one step in said fault mode;

means for enabling said computer means to establish, in each said step, a pre-test waiting period and a testing period which follows said pre-test waiting period;

means for enabling said computer means to cause said switching means to be in a closed condition during said pre-test waiting period; and means for enabling said computer means to cause said switching means to be in an open condition during said testing period.

15. The computer program product according to claim 14, wherein:

said means for enabling said computer means to establish a normal mode and a fault mode includes means for enabling said computer means to dictate the existence of said normal mode versus the existence of said fault mode; and said means for enabling said computer means to establish a pre-test waiting period and a testing period includes means for enabling said computer means to dictate the existence of said pre-test waiting period versus the existence of said testing period.

16. The computer program product according to claim 15, wherein:

(a) when there is an absence of simultaneous indication of a normal condition by both said sensing means at any time during said pre-test waiting period:

at the conclusion of said pre-test waiting period, said computer means causes said switching means to adjust to an open condition;

said computer means dictates that said fault mode continue to exist; and at the conclusion of said pre-test waiting period, said computer means dictates that testing period of the same said step commence;

(b) when there is an absence of simultaneous indication of a normal condition by both said sensing means at any time during said testing period:

at the conclusion of said testing period, said computer means causes said switching means to adjust to a closed condition;

said computer means dictates that said fault mode continue to exist; and at the conclusion of said testing period, if there is a next step, said computer means dictates that said pre-test waiting period of the said next step commence;

(c) when there is simultaneous indication of a normal condition by both said sensing means at any time during said pre-test waiting period:

said computer means causes said switching means to be in an open condition at the conclusion of said pre-test waiting period;

said computer means dictates that said normal mode exist, said computer means thereby dictating that said fault mode cease to exist;

(d) when there is simultaneous indication of a normal condition by both said sensing means at any time during said pre-test waiting period:

said computer means causes said switching means to be in an open condition at the conclusion of said pre-test waiting period; and said computer means dictates that said normal mode exist, said computer means thereby dictating that said fault mode cease to exist.

17. The computer program product according to claim 16, wherein:

said computer program logic further comprises means for enabling said computer to confirm ascertainment of the state of defectiveness of said station; and when there is an absence of simultaneous indication of a normal condition by both said sensing means at any time during said testing period, at the conclusion of said testing period, if there is not a said next step, said computer means confirms ascertainment of the state of defectiveness of said station.

18. The computer program product according to claim 16, wherein said computer program logic further comprises:

means for enabling said computer means to establish, in said fault mode, a transient period which precedes the first said step; and means for enabling said computer means to cause said switching means to remain in an open condition during said transient period.

19. The computer program product according to claim 18, wherein:

(a) when there is an absence of simultaneous indication of a normal condition by both said sensing means at any time during said transient period:

at the conclusion of said transient period, said computer means causes said switching means to adjust to a closed condition;

said computer means dictates that said fault mode continue to exist; and at the conclusion of said transient period, said computer means dictates that said testing period of the first said step commence;

(b) when there is simultaneous indication of a normal condition by both said sensing means at any time during said transient waiting period:

said computer means causes said switching means to be in an open condition at the conclusion of said transient waiting period; and said computer means dictates that said normal mode exist, said computer means thereby dictating that said fault mode cease to exist.

20. The computer program product according to claim 19, wherein:

said at least one step is at least two said steps;

each said step except the final step is followed by a said pre-test waiting period of the said next step;

beginning the second step, each said pre-test waiting period is shorter than the next said pre-test waiting period; and beginning the said second step, each said testing period is longer than the next said testing period.

21. The computer program product according to claim 20, wherein said computer program logic further comprises means for enabling said computer means to establish the duration of said transient period, the duration of each said pre-test waiting period, and the duration of each said testing period, wherein said establishing of durations is defined by the following reasoning:
  the amount of time required for said switching means to be adjusted from a closed condition to an open condition, and for said system to stabilize, is designated "o";
  the amount of time required for said switching means to be adjusted from an open condition to a closed condition, and for said system to stabilize, is designated "c";
  a selected additional time interval is designated "m", wherein m is added onto o, and wherein m is added onto c;
  the expression 2(c+m) is designated "p", wherein p is equal to the value 2(c+m);
  the total number of said steps is designated "$n_T$";
  each said step is designated the "n"th step, wherein "n" corresponds to the sequential number of said step;
  said pre-test waiting period of the "n"th step will be equal to a value of no less than np and no greater than (n+1)p;
  said transient period will be equal to the value $[(n_T+1)c+m]$; and
  said testing period of the said "n"th step will be equal to the value $[(n_T-n+1)c+m]$.

22. A method for effectuation in relation with an electro-mechanical system for motivating an entity through at least one pathway of said system, said system having at least one station, each said station including valvular means and a pair of sensing means on both sides of said valvular means; said method being for recognizing at least one defective condition within said electro-mechanical system, said method comprising associating, with each of at least one said station, a processor for effecting control with respect to said associated station, wherein with regard to said associated station:
  said processor receives information from each said sensing means;
  said processor regulates each said switching means;
  said processor provides for a normal mode and a defective mode;
  said defective mode includes an initial waiting period and a succession of plural steps;
  said initial waiting period precedes said succession of plural steps;
  each said step has a step waiting period and a step testing period, within each said step said step waiting period precedes said step testing period;
  as said succession of plural steps advances, the duration of each said step waiting period increases;
  as said succession of plural steps advances, the duration of each said step testing period decreases;
  during said normal mode, said valvular means is in an open position;
  during said initial waiting period, said valvular means is in an open position;
  during each said step waiting period, said valvular means is in a closed position;
  during each said step testing period, said valvular means is in an open position;
  said normal mode ends and said defective mode begins as a consequence of the occurrence, at any time during said normal mode, of a defective condition pertaining to at least one said sensing means; and
  said defective mode ends and said normal mode begins as a consequence of the simultaneous occurrence, at any time during said defective mode, of a normal condition pertaining to both said sensing means.

23. A method as recited in claim 22, wherein:
  said normal mode continues in the absence of the occurrence, at any time during said normal mode, of a defective condition pertaining to at least one said sensing means; and
  said defective mode continues in the absence of the simultaneous occurrence, at any time during said defective mode, of a normal condition pertaining to both said sensing means.

24. A method as recited in claim 23, wherein said defective condition is deemed fully recognized upon the completion of the final said testing period of said defective mode.

25. A method for effectuation in relation with an electro-mechanical system for motivating a flowable entity through at least one pathway of said system, said system having at least one station, each said station including valvular means and two sensing means wherein said valvular means is generally interposed between said two sensing means; said method being for recognizing at least one defective condition within said electro-mechanical system, wherein with regard to each of at least one said station said method comprises receiving information from each said sensing means and regulating said switching means, wherein based on said received information said regulating is described by the following:
  said system is considered to be in one of a normal mode and a defective mode;
  said defective mode includes an initial waiting period and a succession of plural steps;
  said initial waiting period precedes said succession of plural steps;
  each said step has a step waiting period and a step testing period;
  within each said step said step waiting period precedes said step testing period;
  as said succession of plural steps advances, the duration of each said step waiting period increases;
  as said succession of plural steps advances, the duration of each said step testing period decreases;
  during said normal mode, said valvular means is in an open position;
  during said initial waiting period, said valvular means is in an open position;
  during each said step waiting period, said valvular means is in a closed position;
  during each said step testing period, said valvular means is in an open position;
  said normal mode ends and said defective mode begins as a consequence of the occurrence, at any time during said normal mode, of a defective condition pertaining to at least one said sensing means; and
  said defective mode ends and said normal mode begins as a consequence of the simultaneous occurrence, at any time during said defective mode, of a normal condition pertaining to both said sensing means.

26. A method as recited in claim 25, wherein:

said normal mode continues in the absence of the occurrence, at any time during said normal mode, of a defective condition pertaining to at least one said sensing means; and said defective mode continues in the absence of the simultaneous occurrence, at any time during said defective mode, of a normal condition pertaining to both said sensing means.

27. A method as recited in claim 26, wherein said defective condition is deemed fully recognized upon the completion of the final said testing period of said defective mode.

* * * * *